(12) United States Patent
Zhang et al.

(10) Patent No.: US 12,206,806 B2
(45) Date of Patent: Jan. 21, 2025

(54) DATA SHARING METHOD, DEVICE, AND SYSTEM

(71) Applicant: Huawei Technologies Co., Ltd., Shenzhen (CN)

(72) Inventors: Yanping Zhang, Shenzhen (CN); Weihua Hu, Shanghai (CN); Jianan Hong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 17/738,483

(22) Filed: May 6, 2022

(65) Prior Publication Data

US 2022/0263672 A1 Aug. 18, 2022

Related U.S. Application Data

(63) Continuation of application No. PCT/CN2020/126534, filed on Nov. 4, 2020.

(30) Foreign Application Priority Data

Nov. 7, 2019 (CN) .......................... 201911083726.5

(51) Int. Cl.
*G06F 16/182* (2019.01)
*H04L 9/00* (2022.01)
*H04L 9/32* (2006.01)

(52) U.S. Cl.
CPC ................ *H04L 9/50* (2022.05); *H04L 9/321* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 10,833,843 B1 * | 11/2020 | Vijayvergia | H04L 9/3242 |
| 10,938,567 B2 * | 3/2021 | Martino | G06Q 20/065 |
| 10,963,582 B1 * | 3/2021 | McCown | G06F 21/602 |
| 2014/0222754 A1 * | 8/2014 | Geddam | H04L 67/1097 |
| | | | 707/609 |
| 2015/0244690 A1 * | 8/2015 | Mossbarger | H04L 9/50 |
| | | | 713/171 |
| 2016/0337950 A1 * | 11/2016 | Navas Cornejo | H04W 48/14 |

(Continued)

FOREIGN PATENT DOCUMENTS

| | | |
|---|---|---|
| CN | 103596172 A | 2/2014 |
| CN | 103986728 A | 8/2014 |

(Continued)

OTHER PUBLICATIONS

ETSI TS 123 502 V15.6.0, Oct. 2019, "5G; Procedures for the 5G System (5GS) (3GPP TS 23.502 version 15.6.0 Release 15)," 362 pages.

(Continued)

*Primary Examiner* — Christopher B Robinson
(74) *Attorney, Agent, or Firm* — Conley Rose, P.C.

(57) ABSTRACT

A data sharing method includes that a first network element receives a user data policy from a terminal device. The first network element obtains user information of the terminal device according to the user data policy. The first network element sends the user information of the terminal device to a second network element according to the user data policy.

20 Claims, 11 Drawing Sheets

---

A first network element receives a user data policy from a terminal device — 701

The first network element obtains user information of the terminal device according to the user data policy — 702

The first network element sends the user information of the terminal device to a second network element according to the user data policy — 703

(56) References Cited

U.S. PATENT DOCUMENTS

| | | | | |
|---|---|---|---|---|
| 2018/0084010 A1* | 3/2018 | Joseph | ................... | H04L 63/20 |
| 2019/0166161 A1 | 5/2019 | Anand et al. | | |
| 2019/0229926 A1* | 7/2019 | Handa | ................... | G06Q 20/40 |
| 2020/0367052 A1* | 11/2020 | Tang | ................... | H04L 12/1407 |
| 2020/0374106 A1* | 11/2020 | Padmanabhan | ....... | H04L 63/105 |

FOREIGN PATENT DOCUMENTS

| | | |
|---|---|---|
| CN | 108462568 A | 8/2018 |
| CN | 109711182 A | 5/2019 |
| CN | 110060112 A | 7/2019 |
| CN | 110086804 A | 8/2019 |
| WO | 2016018072 A1 | 2/2016 |
| WO | 2019021105 A1 | 1/2019 |

OTHER PUBLICATIONS

3GPP TS 23.501 V16.2.0, Sep. 2019, "3rd Generation Partnership Project; Technical Specification Group Services and System Aspects; System Architecture for the 5G System (5GS); Stage 2," 389 pages.
3GPP TS 23.502 V16.2.0, Sep. 2019, "3rd Generation Partnership Project; Technical Specification Group Services and System Aspects; Procedures for the 5G System (5GS); Stage 2 (Release 16)," 524 pages.

* cited by examiner

DATA SHARING METHOD, DEVICE, AND SYSTEM

CROSS-REFERENCE TO RELATED APPLICATIONS

This is a continuation of International Patent Application No. PCT/CN2020/126534 filed on Nov. 4, 2020, which claims priority to Chinese Patent Application No. 201911083726.5 filed on Nov. 7, 2019. The disclosures of the aforementioned applications are hereby incorporated by reference in their entireties.

TECHNICAL FIELD

This application relates to the field of communication technologies, and in particular, to a data sharing method, a device, and a system.

BACKGROUND

Telecom operators provide user information to third-party applications because of operation needs. Further, an application function (AF) network element of a third party can subscribe to events from other network elements, for example, an access and mobility management function (AMF) network element, a session management function (SMF) network element, or a policy control function (PCF) network element) through a network capability exposure function (NEF) network element, to obtain user information. However, in this manner, all user information is stored by the operators, and users have no means or permission to manage their own information. This is clearly not favorable for protection of the user information.

SUMMARY

Embodiments of this application provide a data sharing method, a device, and a system to implement autonomous management of user information. This is favorable for protection of the user information.

To achieve the foregoing objectives, the following technical solutions are used in the embodiments of this application.

According to a first aspect, a data sharing method is provided. The method includes that a first network element receives a user data policy from a terminal device. The first network element obtains user information of the terminal device according to the user data policy. The first network element sends the user information of the terminal device to a second network element according to the user data policy. In current technology, some of the user information is collected and used with user permission, and other user information is still collected, sold, and used without user awareness, which leads to leakage and even abuse of the user information. Based on this solution, in this embodiment of this application, the first network element may obtain the user information of the terminal device according to the user data policy of the terminal device, and send the user information of the terminal device to the second network element according to the user data policy of the terminal device. In other words, in a process of collecting and reporting the user information, the first network element considers the user data policy of the terminal device, thereby really implementing autonomous management of the user information. This is favorable for protection of the user information.

In a possible design, when the user data policy includes a collection policy, that the first network element obtains user information of the terminal device according to the user data policy includes that the first network element obtains the user information of the terminal device according to the collection policy.

In a possible design, when the user data policy includes a storage policy, and the storage policy includes an address of the second network element, that the first network element sends the user information of the terminal device to a second network element according to the user data policy includes that the first network element sends the user information of the terminal device to the second network element based on the address of the second network element.

In a possible design, that a first network element receives a user data policy from a terminal device includes that the first network element receives the user data policy from the terminal device through a blockchain account management function (BCAMF) network element or a blockchain system.

In a possible design, the method further includes that the first network element writes a first transaction record into a blockchain system, where first transaction record includes first information, and the first information is used to indicate that the first network element has sent the user information of the terminal device to the second network element.

In a possible design, the first information includes a signature of the first network element and an identifier of the second network element.

In a possible design, the second network element is a third-party server, and that the first network element sends the user information of the terminal device to a second network element according to the user data policy includes that the first network element sends the user information of the terminal device to the third-party server through a blockchain system according to the user data policy.

In a possible design, the second network element is a storage server, and the method further includes that the first network element stores the user information of the terminal device into a blockchain system after hashing the user information. Hashing in the embodiments of this application refers to hash encryption. This is uniformly described herein. Details are not described herein again.

Optionally, the hashed user information of the terminal device is used to verify whether the user information of the terminal device stored in the storage server is tampered with.

In a possible design, the method further includes that the first network element receives a first message, where the first message is used to subscribe to the user information of the terminal device from the first network element.

In a possible design, when the first network element does not have a BCHF, that the first network element receives a first message includes that the first network element receives the first message from a BCHF network element.

In a possible design, when the first network element has a BCHF, that the first network element receives a first message includes that the first network element receives the first message from a blockchain system.

In a possible design, the first message includes address information of the second network element. For example, the second network element may be, for example, a storage server.

In a possible design, the second network element is a third-party server, and the method further includes that the first network element receives a second message, where the second message is used to query the user information of the terminal device.

In a possible design, when the first network element does not have a BCHF, that the first network element receives a second message includes that the first network element receives the second message from a BCHF network element.

In a possible design, when the first network element has a BCHF, that the first network element receives a second message includes that the first network element receives the second message from a blockchain system.

According to a second aspect, a data sharing method is provided. The method includes that a third network element obtains a first transaction record, where the first transaction record includes first information, and the first information is used to indicate that a first network element has sent user information of a terminal device to a second network element. The third network element publishes the first transaction record in a blockchain system. Optionally, after verifying that the transaction is valid, the blockchain system may store the first transaction record. Based on this solution, the first information used to indicate that the first network element has sent the user information of the terminal device to the second network element is stored in the blockchain system as the first transaction record, thereby ensuring traceability of the user information of the terminal device.

In a possible design, the first information includes a signature of the first network element and an identifier of the second network element.

In a possible design, the method further includes that the third network element receives a third message, where the third message is used by the third-party server to subscribe to the user information of the terminal device. The third network element sends a fourth message, where the fourth message is used to subscribe to the user information of the terminal device from the first network element.

In a possible design, when the third network element is one member node in the blockchain system, and the third-party server does not have a BCHF, that the third network element receives a third message includes that the third network element receives a second message from a BCHF network element. Correspondingly, that the third network element sends a fourth message includes, when the first network element has a BCHF, the third network element sends the fourth message to the first network element, or when the first network element does not have a BCHF, the third network element sends the fourth message to a BCHF network element between the third network element and the blockchain system.

In a possible design, when the third network element is one member node in the blockchain system, and the third-party server has a BCHF, that the third network element receives a third message includes that the third network element receives the third message from the third-party server. Correspondingly, that the third network element sends a fourth message includes, when the first network element has a BCHF, the third network element sends the fourth message to the first network element, or when the first network element does not have a BCHF, the third network element sends the fourth message to a BCHF network element between the third network element and the blockchain system.

In a possible design, when the third network element is a BCHF network element between the third-party server and the blockchain system, that the third network element receives a third message includes that the third network element receives the third message from the third-party server. Correspondingly, that the third network element sends a fourth message includes that the third network element sends the fourth message to the blockchain system.

In a possible design, when the third network element is a BCHF network element between the first network element and the blockchain system, that the third network element receives a third message includes that the third network element receives the third message from the blockchain system. Correspondingly, that the third network element sends a fourth message includes that the third network element sends the fourth message to the first network element.

In a possible design, that a third network element obtains a first transaction record includes that the third network element receives the first transaction record from the first network element.

In a possible design, the second network element is a third-party server, and that a third network element obtains a first transaction record includes that the third network element receives the user information of the terminal device from the first network element, and generates the first transaction record based on the user information of the terminal device. The method further includes that the third network element sends the user information of the terminal device to the third-party server.

In a possible design, the third network element is one member node in the blockchain system, and that the third network element sends the user information of the terminal device to the third-party server includes that the third network element sends the user information of the terminal device to the third-party server according to a storage policy in a user data policy of the terminal device.

In a possible design, the second network element is a storage server, and the method further includes that the third network element receives a fifth message, where the fifth message is used by the third-party server to query the user information of the terminal device. The third network element obtains a storage address of the user information of the terminal device from the blockchain system. The third network element sends the storage address of the user information of the terminal device to the third-party server. Based on this solution, in this embodiment of this application, when the third-party server queries the user information of the terminal device, the third network element obtains the storage address of the user information of the terminal device from the blockchain system, and further sends the storage address to the third-party server. The third-party server obtains the user information of the terminal device from a storage server corresponding to the storage address. In other words, when the third-party server queries the user information of the terminal device, access permission of the third-party server needs to be verified by using the blockchain system. In addition, the storage address of the user information of the terminal device is stored in the blockchain system, which also ensures privacy and immutability of the storage address. This is favorable for protection of the user information.

In a possible design, when the third network element is one member node in the blockchain system, and the third-party server does not have a BCHF, that the third network element receives a fifth message includes that the third network element receives the fifth message from a BCHF network element. Correspondingly, that the third network element sends the storage address of the user information of the terminal device to the third-party server includes that the third network element sends the storage address of the user information of the terminal device to the third-party server through the BCHF network element.

In a possible design, when the third network element is one member node in the blockchain system, and the third-party server has a BCHF, that the third network element receives a fifth message includes that the third network element receives the fifth message from the third-party server.

In a possible design, when the third network element is a BCHF network element between the third-party server and the blockchain system, that the third network element receives a fifth message includes that the third network element receives the fifth message from the third-party server.

In a possible design, the method further includes that the third network element obtains one or more of hashed user information of the terminal device or an information access password from the blockchain system. Further, the third network element sends the one or more of the hashed user information of the terminal device or the information access password to the third-party server.

Optionally, the information access password is used to obtain the user information of the terminal device from the storage server corresponding to the storage address of the user information of the terminal device. The hashed user information of the terminal device is used to verify whether the user information of the terminal device obtained from the storage server is tampered with.

In a possible design, the method further includes that the third network element receives a third transaction record from the third-party server, where the third transaction record includes third information, and the third information is used to indicate that the storage server has sent the user information of the terminal device to the third-party server. The third network element publishes the third transaction record in the blockchain system. Optionally, after verifying that the transaction is valid, the blockchain system may store the third transaction record. Based on this solution, traceability of access to the user information of the terminal device can be ensured.

In a possible design, the third information includes a signature of the third-party server and an identifier of the storage server.

In a possible design, the second network element is a third-party server, and the method further includes that the third network element receives a sixth message, where the sixth message is used by the third-party server to query the user information of the terminal device. The third network element obtains the user information of the terminal device from the first network element. The third network element sends the user information of the terminal device to the third-party server.

In a possible design, when the third network element is one member node in the blockchain system, and the third-party server does not have a BCHF, that the third network element receives a sixth message includes that the third network element receives the sixth message from a BCHF network element. Correspondingly, that the third network element sends the user information of the terminal device to the third-party server includes that the third network element sends the user information of the terminal device to the third-party server through the BCHF network element.

In a possible design, when the third network element is one member node in the blockchain system, and the third-party server has a BCHF, that the third network element receives a sixth message includes that the third network element receives the sixth message from the third-party server.

In a possible design, when the third network element is a BCHF network element between the third-party server and the blockchain system, that the third network element receives a sixth message includes that the third network element receives the sixth message from the third-party server.

In a possible design, when the third network element is a BCHF network element between the first network element and the blockchain system, that the third network element receives a sixth message includes that the third network element receives the sixth message from the blockchain system. Correspondingly, that the third network element sends the user information of the terminal device to the third-party server includes that the third network element sends the user information of the terminal device to the third-party server through the blockchain system.

According to a third aspect, a data sharing method is provided. The method includes that a third network element receives a sixth message, where the sixth message is used by a third-party server to query user information of a terminal device. The third network element obtains the user information of the terminal device from a first network element. The third network element sends the user information of the terminal device to the third-party server. For a manner in which the third network element receives the sixth message and sends the user information of the terminal device, refer to the second aspect. Details are not described herein again. Based on this solution, the third-party server can obtain the user information of the terminal device.

In a possible design, when a user data policy includes an access policy, that the third network element verifies, according to the user data policy of the terminal device, that the third-party server has permission to access the user information of the terminal device includes that the third network element verifies, according to the access policy, that the third-party server has permission to access the user information of the terminal device.

In a possible design, the method further includes that the third network element publishes a second transaction record in a blockchain system. Optionally, after verifying that the transaction is valid, the blockchain system may store the second transaction record, where the second transaction record includes second information, and the second information is used to indicate that the first network element has sent the user information of the terminal device to the third-party server.

In a possible design, the second information includes a signature of the first network element and an identifier of the third-party server.

According to a fourth aspect, a data sharing method is provided. The method includes that a third network element receives a fifth message, where the fifth message is used by a third-party server to query user information of a terminal device. The third network element obtains a storage address of the user information of the terminal device from a blockchain system. The third network element sends the storage address of the user information of the terminal device to the third-party server. For a manner in which the third network element receives the fifth message and sends the storage address of the user information of the terminal device, refer to the second aspect. Details are not described herein again. In this embodiment of this application, when the third-party server queries the user information of the terminal device, the third network element obtains the storage address of the user information of the terminal device from the blockchain system, and further sends the storage address to the third-party server. The third-party server obtains the user information of the terminal device from a storage server corresponding to the storage address. In other words, when the third-party server queries the user information of the terminal device, access permission of the third-party server needs to be verified by using the blockchain system. In addition, the storage address of the user information of the terminal device is stored in the blockchain system, which also ensures privacy and immutability of the storage address. This is favorable for protection of the user information.

In a possible design, the method further includes that the third network element obtains one or more of hashed user information of the terminal device or an information access password from the blockchain system. Further, the third network element sends the one or more of the hashed user information of the terminal device or the information access password to the third-party server.

Optionally, the information access password is used to obtain the user information of the terminal device from the storage server corresponding to the storage address of the user information of the terminal device. The hashed user information of the terminal device is used to verify whether the user information of the terminal device obtained from the storage server is tampered with.

In a possible design, the method further includes that the third network element receives a third transaction record from the third-party server, where the third transaction record includes third information, and the third information is used to indicate that the storage server has sent the user information of the terminal device to the third-party server. The third network element publishes the third transaction record in the blockchain system. Optionally, after verifying that the transaction is valid, the blockchain system may store the third transaction record. Based on this solution, traceability of access to the user information of the terminal device can be ensured.

In a possible design, the third information includes a signature of the third-party server and an identifier of the storage server.

According to a fifth aspect, a data sharing method is provided. The method includes that a third network element receives a seventh message, where the seventh message is used by a third-party server to query an information access password of user information of a terminal device. The third network element obtains the information access password from a blockchain system. The third network element sends the information access password to the third-party server. For a manner in which the third network element receives the seventh message and sends the information access password, refer to the manner in which the third network element receives the fifth message and sends the storage address of the user information of the terminal device in the fourth aspect. Details are not described herein again. Based on this solution, when the third-party server has obtained encrypted user information of the terminal device, but the third-party server has no information access password or the information access password is invalid, on the one hand, the third-party server can decrypt the encrypted user information of the terminal device according to the information access password obtained from the blockchain system, to obtain the user information of the terminal device, and on the other hand, the blockchain system may record the transaction in which the third-party server obtains the user information of the terminal device, to ensure traceability of access to the user information of the terminal device.

In a possible design, the method further includes that the third network element obtains hashed user information of the terminal device from the blockchain system. Further, the third network element sends the hashed user information of the terminal device to the third-party server. In this way, the third-party server can verify, based on the hashed user information of the terminal device, whether user information of the terminal device obtained from another third-party server is tampered with. For example, after hashing the user information of the terminal device obtained from the other server, the third-party server compares the hashed user information obtained from the other server with the hashed user information of the terminal device obtained from the blockchain system. If the hashed user information obtained from the other server is the same as the hashed user information obtained from the blockchain system, it may prove that the user information is not tampered with. Otherwise, it may be considered that the user information of the terminal device is tampered with. Further, if the user information of the terminal device is not tampered with, the third-party server may decrypt the encrypted user information according to the information access password, to obtain the user information of the terminal device.

With reference to any one of the second aspect to the fifth aspect, in a possible design, the third network element is one member node in the blockchain system, and the method further includes that the third network element verifies, according to a user data policy of the terminal device, that the third-party server has permission to access the user information of the terminal device. In current technology, some of the user information is collected and used with user permission, and other user information is still collected, sold, and used without user awareness, which leads to leakage and even abuse of the user information. Based on this solution, in this embodiment of this application, when the third-party server queries the user information of the terminal device, the third network element can obtain the user information of the terminal device only after verifying, according to the user data policy of the terminal device, that the third-party server has permission to access the user information of the terminal device. In other words, when the third-party server needs to obtain the user information of the terminal device, the third network element considers the user data policy of the terminal device, and can obtain the user information of the terminal device only after verifying that the third-party server has permission to access the user information of the terminal device, thereby really implementing autonomous management of the user information. This is favorable for protection of the user information.

With reference to any one of the second aspect to the fifth aspect, in a possible design, when the user data policy includes an access policy, that the third network element verifies, according to a user data policy of the terminal device, that the third-party server has permission to access the user information of the terminal device includes that the third network element verifies, according to the access policy, that the third-party server has permission to access the user information of the terminal device.

With reference to any one of the second aspect to the fifth aspect, in a possible design, the method further includes that the third network element receives the user data policy from the terminal device through a BCAMF network element. In this embodiment of this application, because the third network element may be one member node in the blockchain system, that is, the user data policy of the terminal device may be stored in the blockchain system and is irrelevant to an operator that merely serves the terminal device, a third party does not need to independently negotiate with the operator, to subscribe to user information subscription and query services. The operator does not need to enable an interface for each third party to subscribe to and query user information, and does not need to verify whether a network element that requests the user information has permission. Instead, the blockchain system performs unified processing, thereby simplifying technical and implementation complexity of information sharing between participants.

According to a sixth aspect, a data sharing method is provided. The method includes that a terminal device obtains a user data policy of the terminal device. The terminal device sends the user data policy to a BCAMF network element. In this way, because the BCAMF network element may send the user data policy to a blockchain system, that is, the user data policy of the terminal device may be stored in the blockchain system and is irrelevant to an operator that merely serves the terminal device, a third party does not need to independently negotiate with the operator, to subscribe to user information subscription and query services. The operator does not need to enable an interface for each third party to subscribe to and query user information, and does not need to verify whether a network element that requests the user information has permission. Instead, the blockchain system performs unified processing, thereby simplifying technical and implementation complexity of information sharing between participants.

In a possible design, when the user data policy includes an access policy, the method further includes that the terminal device receives an eighth message from a blockchain system, where the eighth message is used to determine whether a third-party server is allowed to access user information of the terminal device. The terminal device sends, to the blockchain system, indication information indicating that authorization succeeds. For example, when the user data policy includes an access policy, and the access policy needs to query the terminal device, the blockchain system may send an eighth message to the terminal device, where the eighth message is used to determine whether a third-party server is allowed to access user information of the terminal device. After obtaining authorization of the terminal device, the third-party server may further access the user information of the terminal device, thereby really implementing autonomous management of the user information. This is favorable for protection of the user information.

With reference to any one of the second aspect to the sixth aspect, in a possible design, the first network element in this embodiment of this application is a mobility management network element or a session management network element.

With reference to any one of the second aspect to the sixth aspect, in a possible design, the third network element in this embodiment of this application is a BCHF network element or one member node in a blockchain system.

With reference to any one of the second aspect to the sixth aspect, in a possible design, the second network element in this embodiment of this application is a third-party server or a storage server.

With reference to any one of the second aspect to the sixth aspect, in a possible design, when the first network element is a mobility management network element, the user information includes one or more of location information of the terminal device in a first time period, an attachment status of the terminal device, or information about a change in an access location of the terminal device.

With reference to any one of the second aspect to the sixth aspect, in a possible design, when the first network element is a session management network element, the user information includes one or more of information about a data network access point accessed by the terminal device, information about a change in a data access point of the terminal device, or content of a network accessed by the terminal device.

With reference to any one of the second aspect to the sixth aspect, in a possible design, the blockchain system in this embodiment of this application may be a consortium blockchain system.

With reference to any one of the second aspect to the sixth aspect, in a possible design, the user data policy includes one or more of a collection policy, an access policy, or a storage policy that is corresponding to data description information.

With reference to any one of the second aspect to the sixth aspect, in a possible design, the data description information includes one or more of an attachment status, an attachment/detachment time, attachment/detachment time statistics, a location, a time of entering and/or leaving a location, a time of staying at a location, location-based statistics, user access content, or user access content statistics.

With reference to any one of the second aspect to the sixth aspect, in a possible design, when the data description information is the attachment status, the collection policy includes one or more of collection denied, collection allowed, collect after inquiring, or collect by default, the access policy includes one or more of a type of an application whose access is allowed, an identifier of an application whose access is allowed, an identifier of an application whose access is denied, a type of an application whose access is denied, a type of an application whose access is allowed after a terminal device is inquired, an identifier of an application whose access is allowed after a terminal device is inquired, access of an application with an application identifier outside an application identifier list being allowed, access of an application with an application identifier outside an application identifier list being denied, or access of an application with an application identifier outside an application identifier list being allowed after inquiring, and the storage policy includes one or more of a storage address, whether to hash and store in a blockchain, an allowed local storage time, or whether to encrypt for storage.

According to a seventh aspect, a communication apparatus is provided to implement the foregoing methods. The communication apparatus may be the first network element in the first aspect, or an apparatus including the first network element. Alternatively, the communication apparatus may be the third network element in the second aspect, the third aspect, the fourth aspect, or the fifth aspect, or an apparatus including the third network element. Alternatively, the communication apparatus may be the terminal device in the sixth aspect, or an apparatus including the terminal device. The communication apparatus includes a corresponding module, unit, or means for implementing the foregoing methods. The module, unit, or means may be implemented by using hardware or software, or implemented by executing corresponding software by executing corresponding hardware. The hardware or the software includes one or more modules or units corresponding to the foregoing functions.

According to an eighth aspect, a communication apparatus is provided. The communication apparatus includes a processor and a memory, where the memory is configured to store computer instructions. When the processor executes the instructions, the communication apparatus is enabled to perform the method according to any one of the foregoing aspects. The communication apparatus may be the first network element in the first aspect, or an apparatus including the first network element. Alternatively, the communication apparatus may be the third network element in the second aspect, the third aspect, the fourth aspect, or the fifth aspect, or an apparatus including the third network element. Alternatively, the communication apparatus may be the terminal device in the sixth aspect, or an apparatus including the terminal device.

According to a ninth aspect, a communication apparatus is provided. The communication apparatus includes a processor. The processor is configured to be coupled to a memory, and after reading instructions in the memory, perform, according to the instructions, the method according to any one of the foregoing aspects. The communication apparatus may be the first network element in the first aspect, or an apparatus including the first network element. Alternatively, the communication apparatus may be the third network element in the second aspect, the third aspect, the fourth aspect, or the fifth aspect, or an apparatus including the third network element. Alternatively, the communication apparatus may be the terminal device in the sixth aspect, or an apparatus including the terminal device.

According to a tenth aspect, a computer-readable storage medium is provided. The computer-readable storage medium stores instructions, and when the instructions are run on a computer, the computer is enabled to perform the method according to any one of the foregoing aspects.

According to an eleventh aspect, a computer program product including instructions is provided, where when the computer program product runs on a computer, the computer is enabled to perform the method according to any one of the foregoing aspects.

According to a twelfth aspect, a communication apparatus (for example, the communication apparatus may be a chip or a chip system) is provided. The communication apparatus includes a processor, configured to implement a function in any one of the foregoing aspects. In a possible design, the communication apparatus further includes a memory, and the memory is configured to store necessary program instructions and data. When the communication apparatus is a chip system, the communication apparatus may include a chip, or may include a chip and another discrete component.

For technical effects brought by any design manner in the seventh aspect to the twelfth aspect, refer to technical effects brought by different design manners in the first aspect, the second aspect, the third aspect, the fourth aspect, the fifth aspect, or the sixth aspect. Details are not described herein again.

According to a thirteenth aspect, a communication system is provided. The communication system includes a first network element and a second network element. The first network element is configured to receive a user data policy from a terminal device, obtain user information of the terminal device according to the user data policy, and send the user information of the terminal device to the second network element according to the user data policy. The second network element is configured to receive the user information of the terminal device from the first network element. For technical effects of the thirteenth aspect, refer to the first aspect. Details are not described herein again.

According to a fourteenth aspect, a communication system is provided. The communication system includes a third network element, a first network element, and a third-party server. The third network element is configured to receive a sixth message, where the sixth message is used by the third-party server to query user information of a terminal device. The third network element is further configured to, after verifying, according to a user data policy of the terminal device, that the third-party server has permission to access the user information of the terminal device, obtain the user information of the terminal device from the first network element, and send the user information of the terminal device to the third-party server. The third-party server is configured to receive the user information of the terminal device from the third network element. For technical effects of the fourteenth aspect, refer to the third aspect. Details are not described herein again.

According to a fifteenth aspect, a communication system is provided. The communication system includes a third network element, a third-party server, and a storage server. The third network element is configured to receive a fifth message, where the fifth message is used by the third-party server to query user information of a terminal device. The third network element is further configured to obtain a storage address of the user information of the terminal device from a blockchain system, and send the storage address of the user information of the terminal device to the third-party server 402. The third-party server is configured to receive the storage address of the user information of the terminal device from the third network element, and obtain, based on the storage address of the user information of the terminal device, the user information of the terminal device from a corresponding storage server. For technical effects of the fifteenth aspect, refer to the fourth aspect. Details are not described herein again.

According to a sixteenth aspect, a communication system is provided. The communication system includes a third network element and a third-party server. The third network element is configured to receive a seventh message, where the seventh message is used by the third-party server to query an information access password of user information of a terminal device. The third network element is further configured to obtain the information access password from a blockchain system, and send the information access password to the third-party server. The third-party server is configured to receive the information access password from the third network element, and decrypt the encrypted user information of the terminal device according to the information access password. For technical effects of the sixteenth aspect, refer to the fifth aspect. Details are not described herein again.

DESCRIPTION OF EMBODIMENTS

For ease of understanding solutions in embodiments of this application, related concepts are first briefly described as follows.

1. Blockchain Technology:

The blockchain technology, also referred to as a distributed ledger technology, is an emerging technology in which several computing devices work together to "keep accounts" (that is, record transaction data) to maintain a complete distributed database. Because the blockchain technology has characteristics of being decentralized (that is, no central node), being open and transparent, allowing each computing device to participate in database recording, and allowing fast data synchronization between computing devices, the blockchain technology has been widely applied in a variety of fields.

In terms of deployment modes, a blockchain can be classified into a public blockchain and a consortium blockchain. The public blockchain is a blockchain that can be read by any device in the world, or a blockchain of a consensus verification process in which any device can participate in a transaction. The consortium blockchain, also referred to as a consortium blockchain, means that participants of a specified blockchain form a consortium and business exchange information between the participants is recorded in the blockchain, with a usage range and permission limited. The blockchain in the embodiments of this application may be the consortium blockchain. This is uniformly described herein. Details are not described herein again.

Figure 1:
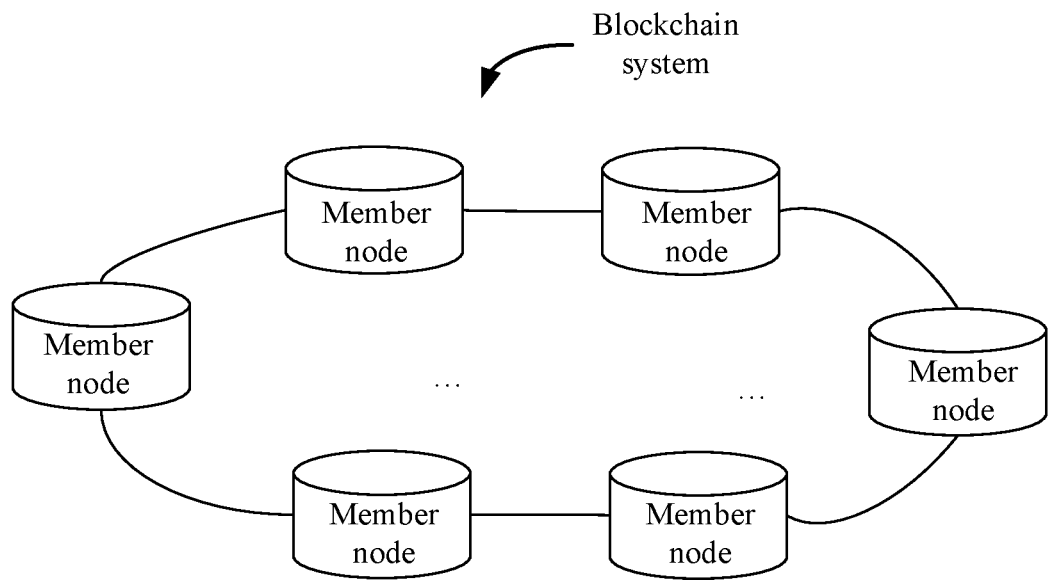
FIG. 1 is a schematic diagram of a structure of a blockchain system according to an embodiment of this application.

2. Blockchain Member Node:

A blockchain in the embodiments of this application may also be referred to as a blockchain system. As shown in FIG. 1, the blockchain system in the embodiments of this application includes a plurality of blockchain member nodes (or member nodes). The member node is a device that has a communication function and a storage function, for example, a device that stores blockchain data. Each member node can receive and generate information. A common blockchain is maintained between different member nodes to maintain communication and data synchronization. Further, in the blockchain system, any member node may generate new blockchain data based on transaction-related data sent by a client, and notify the other member nodes in a broadcast manner. The other member nodes may verify the blockchain data. When all member nodes in the blockchain system reach a consensus, the new blockchain data can be added to the blockchain.

Optionally, the member node in the embodiments of this application may be understood as a processing unit. In one implementation, the member node may be a physical device, such as a server or a computer. In another implementation, the member node may be a virtual computer. The virtual computer is a collective term of running environments virtualized by using software in all types of virtualization devices. The concept of virtual computer includes a virtual machine and a container. In another implementation, the member node in the embodiments of this application may be a process or a thread. The thread is a minimum unit that can perform operation scheduling in an operating system. The thread is included in the process and is an actual operating unit in the process. The process is an activity of running a program in a computer on a data set, and is a basic unit for resource allocation and scheduling in a system.

3. User Information Sharing:

User information in the embodiments of this application includes information such as user privacy data. The user information is primarily stored and managed by a service provider (such as FACEBOOK, GOOGLE, WECHAT, and SINA WIEBO). When a third-party application, such as Mobike, needs to access user information, a third-party server obtains corresponding user information (for example, user location, avatar, or nickname) from the service provider after obtaining user authorization. In this manner, the user information belongs to the service provider, and users have no means or permission to manage their own data. User privacy security and the like solely depend on compliance with legal and ethical standards by the service provider and technical strength of the service provider. This is not favorable for protection of the user information. However, prohibiting user information sharing totally may have a large impact on user service experience. For example, before obtaining services, users need to register with different service providers, and bother to fill in same form data (such as age, occupation, address, hobbies, or education) repeatedly. In addition, because the user information cannot be shared, the service provider lacks analysis on user behavior or hobbies and cannot provide accurate and comfortable services, such as Taobao's targeted product recommendation.

Similarly, telecom operators may also provide user information to third-party applications because of operation needs. As mentioned in the background, in this manner, all user information is stored by the operators, and the users have no means or permission to manage their own information. This is clearly not favorable for protection of the user information.

The following describes the technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, words such as "first" and "second" are used in the embodiments of this application to distinguish between same items or similar items that have basically the same functions or purposes. A person skilled in the art may understand that the words such as "first" and "second" do not limit a quantity and an execution sequence, and the words such as "first" and "second" do not indicate a definite difference. In addition, in the embodiments of this application, the word such as "example" or "for example" is used to represent giving an example, an illustration, or a description. Any embodiment or design scheme described as an "example" or "for example" in the embodiments of this application should not be interpreted as being more preferred or advantageous than another embodiment or design scheme. Further, use of the word such as "example" or "for example" is intended to present a relative concept in a specific manner for ease of understanding.

In addition, network architectures and service scenarios described in the embodiments of this application are intended to describe the technical solutions in the embodiments of this application more clearly, and do not constitute a limitation on the technical solutions provided in the embodiments of this application. A person of ordinary skill in the art may learn that with evolution of the network architectures and emergence of new service scenarios, the technical solutions provided in the embodiments of this application are also applicable to similar technical problems.

Figure 2:
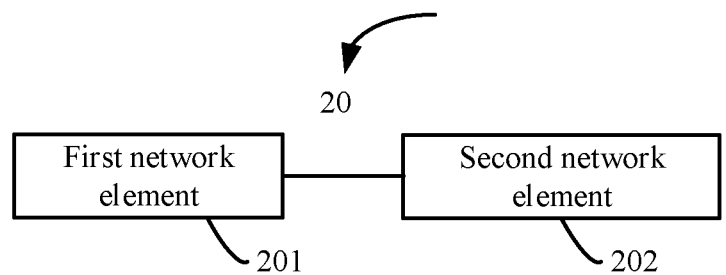
FIG. 2 is a schematic diagram of a structure of a communication system according to an embodiment of this application.

FIG. 2 shows a communication system 20 according to an embodiment of this application. The communication system 20 includes a first network element 201 and a second network element 202. The first network element 201 and the second network element 202 may directly communicate with each other, or may communicate with each other through forwarding by another device. This is not limited in this embodiment of this application.

For example, the first network element 201 in this embodiment of this application may be, for example, a mobility management network element or a session management network element.

Optionally, the mobility management network element in this embodiment of this application is mainly used for mobility management in a mobile network, for example, user location update, registration of a user with a network, or user switching. In a fifth generation (5G) communication system, the mobility management network element may be an AMF network element, Namf is a service-based interface provided by the AMF network element, and the AMF network element may communicate with another network function through the Namf. In a future communication system, for example, a sixth generation (6G) communication system, the mobility management network element may still be an AMF network element, or may have another name. This is not limited in this embodiment of this application.

Optionally, the session management network element in this embodiment of this application is mainly used for session management in a mobile network, for example, session establishment, modification, or release. A specific function is, for example, allocating an Internet Protocol (IP) address to a user, or selecting a user plane network element that provides a packet forwarding function. In a 5G communication system, the session management network element may be an SMF network element, Nsmf is a service-based interface provided by the SMF, and the SMF may communicate with another network function through the Nsmf. In a future communication system, for example, a 6G communication system, the session management network element may still be an SMF network element, or may have another name. This is not limited in this embodiment of this application.

For example, the second network element 202 in this embodiment of this application may be, for example, a third-party server or a storage server.

Optionally, a third party corresponding to the third-party server in this embodiment of this application includes a vertical industry user, an application service provider, an individual, an enterprise, or the like that has a user information subscription requirement or obtaining requirement. This is not limited in this embodiment of this application. The third-party server may be an AF network element in the current 5G communication system. This is uniformly described herein. Details are not described herein again.

Optionally, the storage server in this embodiment of this application is a network element configured to store user information. The storage server may be a server used by a third party for storage, for example, a server of a big data analysis company that needs to purchase user information for analysis. Alternatively, the storage server may be a storage device unrelated to a third party, for example, a storage space purchased by a user on a cloud platform. This is uniformly described herein. Details are not described herein again.

In this embodiment of this application, the first network element 201 is configured to receive a user data policy from a terminal device, obtain user information of the terminal device according to the user data policy, and send the user information of the terminal device to the second network element 202 according to the user data policy. The second network element 202 is configured to receive the user information of the terminal device from the first network element 201. A specific implementation of the foregoing solution is described in detail in subsequent method embodiments. Details are not described herein.

In a possible implementation, that the first network element 201 is configured to receive a user data policy from a terminal device includes that the first network element 201 is configured to receive the user data policy from the terminal device through a blockchain system.

Optionally, in this embodiment of this application, the first network element may directly interact with the blockchain system, or may interact with the blockchain system through a blockchain handling function (BCHF) network element newly added to the current communication system 20. This is not limited in this embodiment of this application. In other words, when the first network element does not have a BCHF (which may also be understood as not supporting blockchain-related operations), the BCHF network element in this embodiment of this application may serve as an agent between the first network element and the blockchain system, to interact with the blockchain system on behalf of the first network element. For example, the BCHF network element is responsible for publishing network processing information to the blockchain system as a transaction, and also publishing network-related things of the blockchain system to the network. A function of the BCHF network element includes but is not limited to one or more of publishing a transaction, recording a block, or executing a smart contract.

Certainly, when another network element does not have a BCHF, the BCHF network element in this embodiment of this application may alternatively serve as an agent between the first network element and the blockchain system, to interact with the blockchain system on behalf of the other network element. For example, in a 5G communication system, when a network exposure function (NEF) network element/unified data management (UDM) network element/unified data repository (UDR) network element does not have a BCHF, the BCHF network element may serve as an agent between the NEF network element/UDM network element/UDR network element and a blockchain system, to interact with the blockchain system on behalf of the NEF network element/UDM network element/UDR network element. Alternatively, in the following embodiments of this application, when the third-party server does not have a BCHF, the BCHF network element may serve as an agent between the third-party server and a blockchain system, to interact with the blockchain system on behalf of the third-party server.

In another possible implementation, that the first network element 201 is configured to receive a user data policy from a terminal device includes that the first network element 201 is configured to receive the user data policy from the terminal device through a BCAMF network element newly added to the current communication system 20. In other words, the BCAMF network element in this embodiment of this application is mainly configured to manage user information access permission. Certainly, in this embodiment of this application, when the BCAMF network element does not have a BCHF, the BCHF network element may serve as an agent between the BCAMF network element and the blockchain system, to interact with the blockchain system on behalf of the BCAMF network element. This is not limited in this embodiment of this application.

In current technology, some of the user information is collected and used with user permission, and other user information is still collected, sold, and used without user awareness, which leads to leakage and even abuse of the user information. Based on the communication system provided in this embodiment of this application, in this embodiment of this application, the first network element may obtain the user information of the terminal device according to the user data policy of the terminal device, and send the user information of the terminal device to the second network element according to the user data policy of the terminal device. In other words, in a process of collecting and reporting the user information, the first network element considers the user data policy of the terminal device, thereby really implementing autonomous management of the user information. This is favorable for protection of the user information.

Figure 3:
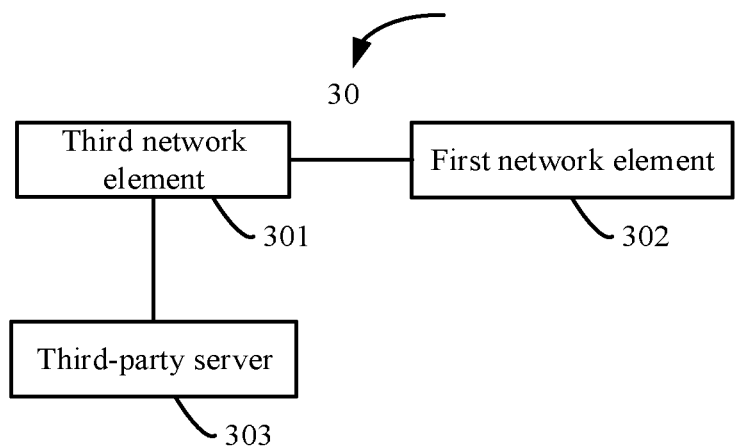
FIG. 3 is a schematic diagram of a structure of a communication system according to an embodiment of this application.

FIG. 3 shows another communication system 30 according to an embodiment of this application. The communication system 30 includes a third network element 301, a first network element 302, and a third-party server 303. The third network element 301 and the third-party server 303 may directly communicate with each other, or may communicate with each other through forwarding by another device. The third network element 301 and the first network element 302 may directly communicate with each other, or may communicate with each other through forwarding by another device. This is not limited in this embodiment of this application.

For example, the third network element 301 in this embodiment of this application may be, for example, one member node in a blockchain system or the foregoing BCHF network element. For related descriptions of the first network element 302 and the third-party server 303, refer to the communication system shown in FIG. 2. Details are not described herein again.

Optionally, when the third network element 301 is one member node in the blockchain system, the third network element 301 is configured to receive a sixth message, where the sixth message is used by the third-party server 303 to query user information of a terminal device. The third network element 301 is further configured to, after verifying, according to a user data policy of the terminal device, that the third-party server has permission to access the user information of the terminal device, obtain the user information of the terminal device from the first network element 302, and send the user information of the terminal device to the third-party server 303. The third-party server 303 is configured to receive the user information of the terminal device from the third network element 301. A specific implementation of the foregoing solution is described in detail in subsequent method embodiments. Details are not described herein.

In a possible implementation, in a scenario in which the third-party server 303 does not have a BCHF, that the third network element 301 is configured to receive a sixth message includes that the third network element is configured to receive the sixth message from the BCHF network element. Correspondingly, that the third network element 301 is configured to send the user information of the terminal device to the third-party server 303 includes that the third network element 301 is configured to send the user information of the terminal device to the third-party server 303 through the BCHF network element.

In another possible implementation, in a scenario in which the third-party server 30 has a BCHF, that the third network element 301 is configured to receive a sixth message includes that the third network element is configured to receive the sixth message from the third-party server.

In a possible implementation, in a scenario in which the first network element 302 does not have a BCHF, that the third network element 301 is configured to obtain the user information of the terminal device from the first network element 302 includes that the third network element 301 is configured to obtain the user information of the terminal device from the first network element 302 through the BCHF network element.

In current technology, some of the user information is collected and used with user permission, and other user information is still collected, sold, and used without user awareness, which leads to leakage and even abuse of the user information. Based on the communication system provided in this embodiment of this application, in this embodiment of this application, when the third-party server queries the user information of the terminal device, the third network element may obtain the user information of the terminal device from the first network element after verifying, according to the user data policy of the terminal device, that the third-party server has permission to access the user information of the terminal device. In other words, when the third-party server needs to obtain the user information of the terminal device, the third network element considers the user data policy of the terminal device, and obtains the user information of the terminal device from the first network element only after verifying that the third-party server has permission to access the user information of the terminal device, thereby really implementing autonomous management of the user information. This is favorable for protection of the user information.

Figure 4:
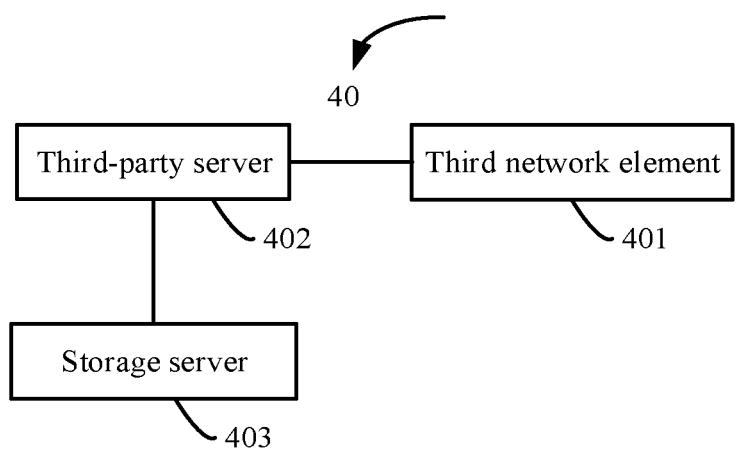
FIG. 4 is a schematic diagram of a structure of a communication system according to an embodiment of this application.

FIG. 4 shows another communication system 40 according to an embodiment of this application. The communication system 40 includes a third network element 401, a third-party server 402, and a storage server 403. The third network element 401 and the third-party server 402 may directly communicate with each other, or may communicate with each other through forwarding by another device. The third-party server 402 and the storage server 403 may directly communicate with each other, or may communicate with each other through forwarding by another device. This is not limited in this embodiment of this application.

For example, the third network element 401 in this embodiment of this application may be, for example, one member node in a blockchain system or the foregoing BCHF network element. For related descriptions of the third-party server 402 and the storage server 403, refer to the communication system shown in FIG. 2. Details are not described herein again.

The third network element 401 is configured to receive a fifth message, where the fifth message is used by the third-party server 402 to query user information of a terminal device. The third network element 401 is further configured to obtain a storage address of the user information of the terminal device from a blockchain system, and send the storage address of the user information of the terminal device to the third-party server 402. The third-party server 402 is configured to receive the storage address of the user information of the terminal device from the third network element 401, and obtain, based on the storage address of the user information of the terminal device, the user information of the terminal device from the corresponding storage server 403. A specific implementation of the foregoing solution is described in detail in subsequent method embodiments. Details are not described herein.

In a possible implementation, in a scenario in which the third-party server 403 does not have a BCHF, when the third network element 401 is one member node in the blockchain system, that the third network element 401 is configured to receive a fifth message includes that the third network element is configured to receive the fifth message from the BCHF network element. Correspondingly, that the third network element 401 is configured to send the storage address of the user information of the terminal device to the third-party server 402 includes that the third network element 401 is configured to send the storage address of the user information of the terminal device to the third-party server 402 through the BCHF network element.

In another possible implementation, in a scenario in which the third-party server 403 does not have a BCHF, when the third network element 401 is the BCHF network element, that the third network element 401 is configured to receive a fifth message includes that the third network element is configured to receive the fifth message from the third-party server.

In still another possible implementation, in a scenario in which the third-party server 403 has a BCHF, when the third network element 401 is one member node in the blockchain system, that the third network element 401 is configured to receive a fifth message includes that the third network element is configured to receive the fifth message from the third-party server.

Based on the communication system provided in this embodiment of this application, in this embodiment of this application, when the third-party server queries the user information of the terminal device, the third network element obtains the storage address of the user information of the terminal device from the blockchain system, and further sends the storage address to the third-party server. The third-party server obtains the user information of the terminal device from a storage server corresponding to the storage address. In other words, when the third-party server queries the user information of the terminal device, access permission of the third-party server needs to be verified by using the blockchain system. In addition, the storage address of the user information of the terminal device is stored in the blockchain system, which also ensures privacy and immutability of the storage address. This is favorable for protection of the user information.

Figure 5:
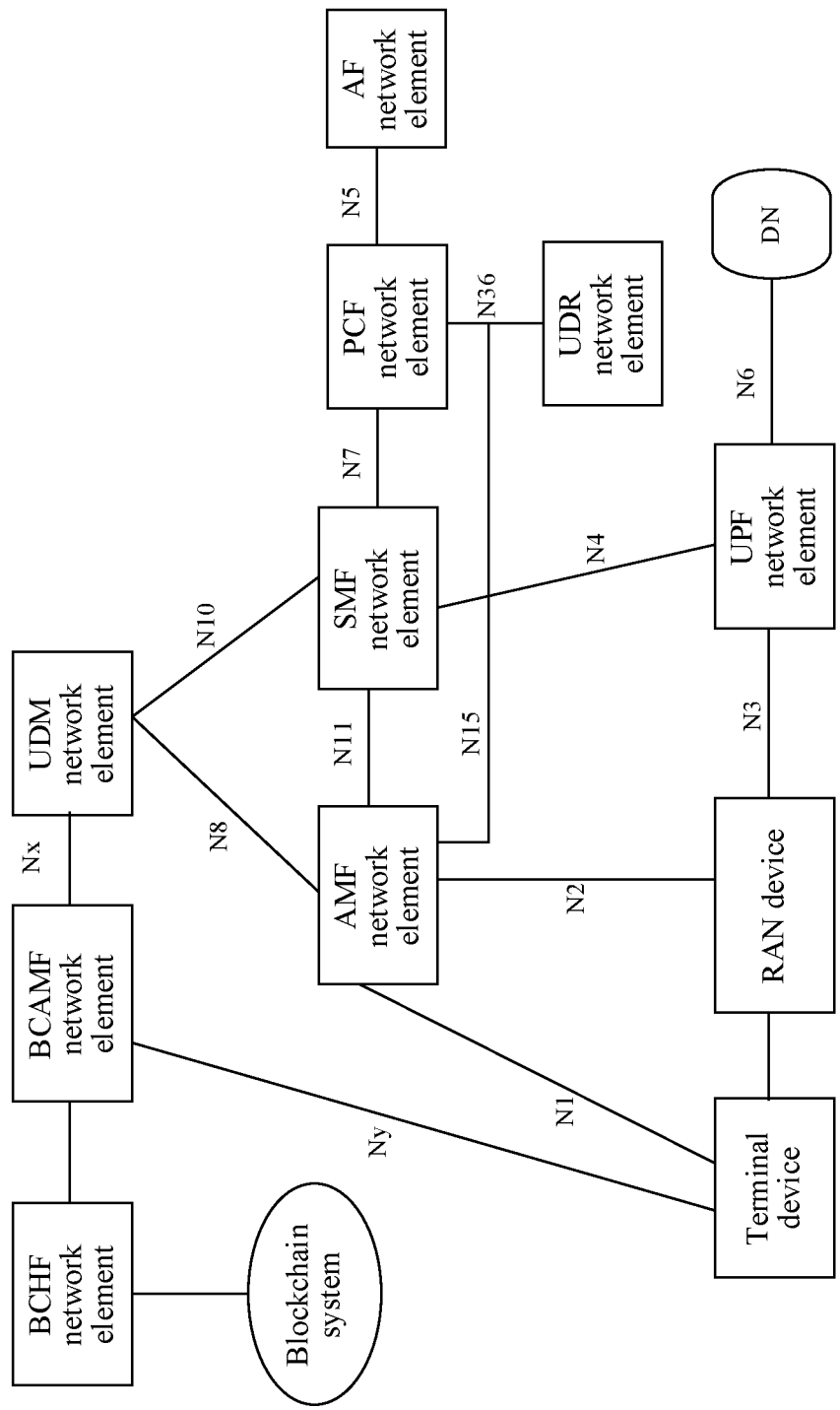
FIG. 5 is a schematic architectural diagram of an applicable communication system according to an embodiment of this application.

A 5G communication system is used as an example. FIG. 5 is a schematic architectural diagram of an applicable communication system according to an embodiment of this application. The communication system includes one or more of a radio access network (RAN) device, an AMF network element, an SMF network element, a PCF network element, a user plane function (UPF) network element, a UDM network element, a UDR network element, an AF network element, a BCHF network element, or a BCAMF network element.

A terminal device communicates with the AMF network element through a next generation network (N) 1 interface (N1), the terminal device communicates with the BCAMF network element through an Ny interface (Ny), the RAN device communicates with the AMF network element through an N2 interface (N2), the RAN device communicates with the UPF network element through an N3 interface (N3), the UPF network element communicates with a data network (DN) through an N6 interface (N6), the AMF network element communicates with the SMF network element through an N11 interface (N11), the AMF network element communicates with the PCF network element through an N15 interface (N15), the SMF network element communicates with the PCF network element through an N7 interface (N7), the SMF network element communicates with the UPF network element through an N4 interface (N4), the PCF network element communicates with the AF network element through an N5 interface (N5), the PCF network element communicates with the UDR network element through an N36 interface (N36), the UDM network element communicates with the AMF network element through an N8 interface (N8), and the UDM network element communicates with the SMF network element through an N10 interface (N10). In addition, the BCAMF network element may communicate with the BCHF network element. Further, when the BCAMF network element does not have a BCHF, the BCHF network element may serve as an agent to write a service record of the BCAMF network element into the blockchain system or notify the BCAMF network element of a service record that is in the blockchain system and that is related to the BCAMF network element.

Optionally, although not shown, the AF network element may communicate with the PCF network element through an NEF network element. This is uniformly described herein. Details are not described herein again.

Optionally, although not shown, a communication interface may exist between the BCHF network element and the UDM network element, the UDR network element, the AMF network element, the SMF network element, or the NEF network element. In this way, when having no BCHF, the UDM network element, the UDR network element, the AMF network element, the SMF network element, or the NEF network element interacts with the blockchain system through the BCHF network element. This is uniformly described herein. Details are not described herein again.

Optionally, the BCHF network element in this embodiment of this application may be a separate function module and is deployed independent of a 5G network element, or may be a distributed function module and is deployed together with a 5G network element. This is not further limited in this embodiment of this application.

Optionally, in this embodiment of this application, the BCHF network element and the BCAMF network element may be deployed together, or may be separately deployed. When the BCHF network element and the BCAMF network element are deployed together, the BCHF network element or the BCAMF network element has a function of processing a registration request of a user and verifying the user, and can publish registration information of the user to the blockchain system as a transaction, obtain information related to the BCAMF network element from the blockchain system, and process the information.

Optionally, the first network element, the second network element, or the third network element in this embodiment of this application may also be referred to as a communication apparatus or a communication device, and may be a general-purpose device or a dedicated device. This is not limited in this embodiment of this application.

Optionally, related functions of the first network element, the second network element, or the third network element in this embodiment of this application may be implemented by one device, or may be implemented by a plurality of devices together, or may be implemented by one or more function modules in one device. This is not limited in this embodiment of this application. It may be understood that the foregoing function may be a network element in a hardware device, a software function running on dedicated hardware, a combination of hardware and software, or a virtualization function instantiated on a platform (for example, a cloud platform).

Figure 6:
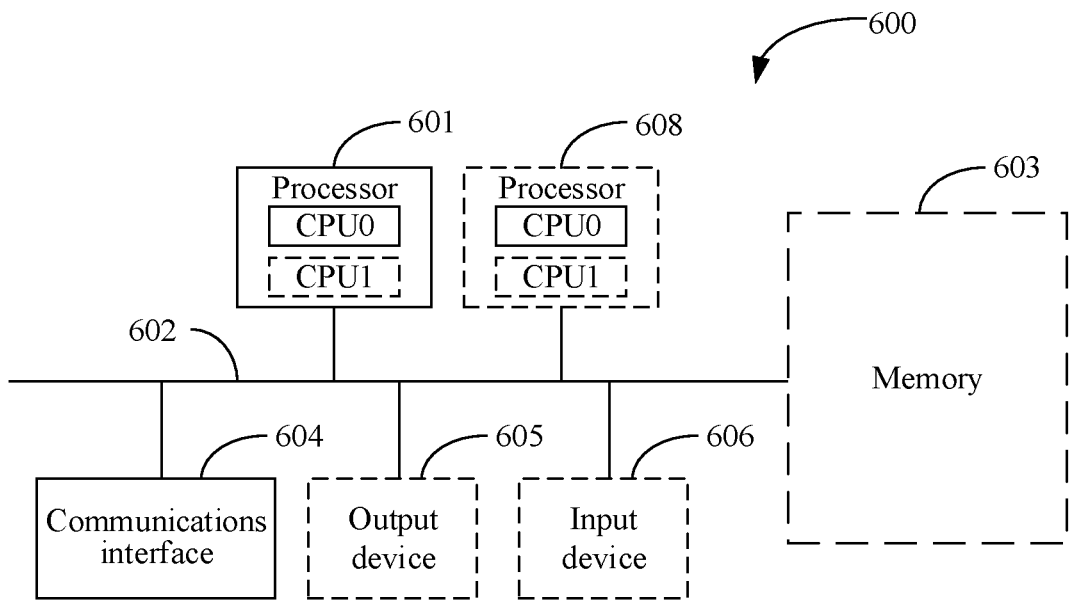
FIG. 6 is a schematic diagram of a structure of a communication device according to an embodiment of this application.

For example, related functions of the first network element, the second network element, or the third network element in this embodiment of this application may be implemented by using a communication device 600 in FIG. 6. FIG. 6 is a schematic diagram of a structure of a communication device 600 according to an embodiment of this application. The communication device 600 includes one or more processors 601, a communication line 602, and at least one communication interface (for example, including a communication interface 604 and one processor 601 in FIG. 6). Optionally, the communication device 600 may further include a memory 603.

The processor 601 may be a general-purpose central processing unit (CPU), a microprocessor, an application-specific integrated circuit (ASIC), or one or more integrated circuits configured to control program execution of the solutions in this application.

The communication line 602 may include a path for connecting different components.

The communication interface 604 may be a transceiver module, and is configured to communicate with another device or a communication network, for example, the Ethernet, a RAN, or a wireless local area network (WLAN). For example, the transceiver module may be an apparatus such as a transceiver or a transceiver machine. Optionally, the communication interface 604 may alternatively be a transceiver circuit located in the processor 601, and is configured to implement signal input and signal output of the processor.

The memory 603 may be an apparatus that has a storage function. For example, the memory 603 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM (CD-ROM) or another CD storage, an optical disc storage (including a CD, a laser disc, an optical disc, a DIGITAL VERSATILE DISC (DVD), a BLU-RAY disc, and the like), a magnetic disk storage medium or another magnetic storage device, or any other medium that can be used to carry or store expected program code in a form of an instruction or a data structure and that can be accessed by a computer. However, the memory 603 is not limited thereto. The memory may exist independently and is connected to the processor through the communication line 602. Alternatively, the memory may be integrated with the processor.

The memory 603 is configured to store computer-executable instructions for performing the solutions in this application, and execution of the computer-executable instructions is controlled by the processor 601. The processor 601 is configured to execute the computer-executable instructions stored in the memory 603, to implement the data sharing method according to the embodiments of this application.

Alternatively, optionally, in this embodiment of this application, the processor 601 may perform a processing-related function in the data sharing method in the following embodiments of this application, and the communication interface 604 is responsible for communicating with another device or a communication network. This is not limited in this embodiment of this application.

Optionally, the computer-executable instructions in this embodiment of this application may also be referred to as application program code. This is not limited in this embodiment of this application.

In a specific implementation, in an embodiment, the processor 601 may include one or more CPUs, for example, a CPU0 and a CPU1 in FIG. 6.

In a specific implementation, in an embodiment, the communication device 600 may include a plurality of processors, for example, a processor 601 and a processor 608 in FIG. 6. Each of these processors may be a single-core processor or a multi-core processor. The processor herein may include but is not limited to at least one of the following various computing devices that run software: a CPU, a microprocessor, a digital signal processor (DSP), a microcontroller unit (MCU), an artificial intelligence processor, or the like. Each computing device may include one or more cores configured to execute software instructions to perform an operation or processing.

In a specific implementation, in an embodiment, the communication device 600 may further include an output device 605 and an input device 606. The output device 605 communicates with the processor 601, and may display information in a plurality of manners. For example, the output device 605 may be a liquid-crystal display (LCD), a light-emitting diode (LED) display device, a cathode-ray tube (CRT) display device, a projector, or the like. The input device 606 communicates with the processor 601, and may receive an input of a user in a plurality of manners. For example, the input device 606 may be a mouse, a keyboard, a touchscreen device, or a sensor device.

The communication device 600 sometimes may also be referred to as a communication apparatus, and may be a general-purpose device or a dedicated device. For example, the communication device 600 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to that in FIG. 6. A type of the communication device 600 is not limited in this embodiment of this application.

Figure 7:
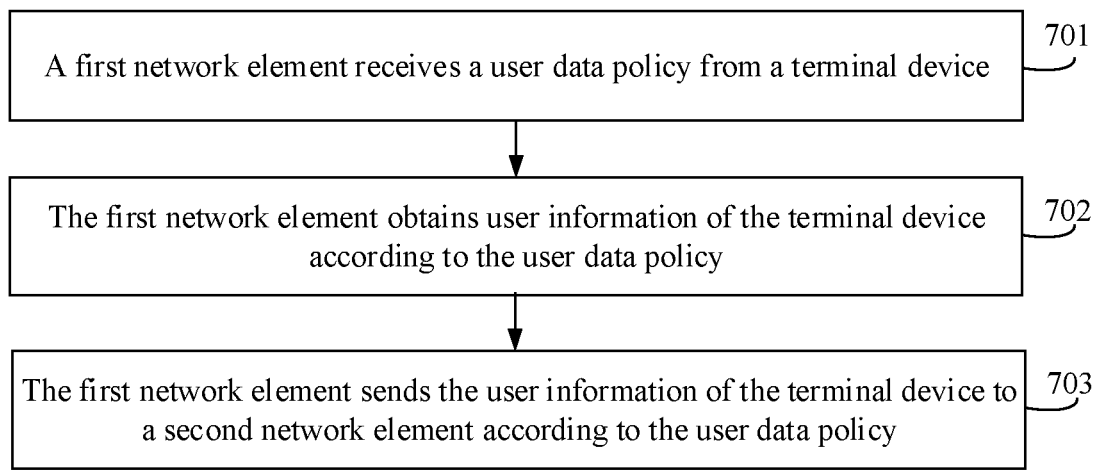
FIG. 7 is a schematic flowchart of a data sharing method according to an embodiment of this application.

FIG. 7 shows a data sharing method according to an embodiment of this application. The method includes the following steps.

S701. A first network element receives a user data policy from a terminal device.

For related descriptions of the first network element and related descriptions of how the first network element receives the user data policy from the terminal device, refer to the related description of the communication system shown in FIG. 2. Details are not described herein again.

In this embodiment of this application, the user data policy of the terminal device includes but is not limited to one or more of a collection policy, an access policy, or a storage policy that is corresponding to data description information. The data description information herein includes but is not limited to one or more of an attachment status, an attachment/detachment time, attachment/detachment time statistics, a location, a time of entering and/or leaving a location, a time of staying at a location, location-based statistics, user access content, or user access content statistics.

For example, when the data description information is the attachment status, a corresponding collection policy, access policy, or storage policy may be shown in Table 1.

Optionally, in this embodiment of this application, the first network element may obtain the user information of the terminal device according to the collection policy in the user data policy.

Optionally, in this embodiment of this application, the user information of the terminal device includes but is not limited to one or more of location information of the terminal device, an attachment status of the terminal device, content of a network accessed by the terminal device, statistical information of the terminal device, information about a change in an access location of the terminal device, information about a data network access point accessed by the terminal device, or information about a change in a data access point of the terminal device.

The location information of the terminal device may be combined with time. For example, the user information of the terminal device may further include a time at which the terminal device enters/leaves a current location (which can be understood as location information in a fixed time period) or duration of the terminal device staying at a current location.

The attachment status of the terminal device is a status in which the terminal device has successfully attached to a network and is being served by the network with a communication service.

The content of the network accessed by the terminal device may include, for example, a ratio of access duration of a game website.

The statistical information of the terminal device includes but is not limited to one or more of a moving track of the terminal device, a time proportion of stay time at a location

TABLE 1

| Data description information | Collection policy | Access policy | Storage policy |
| --- | --- | --- | --- |
| Attachment status | One or more of collection denied, collection allowed, collect after inquiring, or collect by default | One or more of a type of an application whose access is allowed, an identifier of an application whose access is allowed, an identifier of an application whose access is denied, a type of an application whose access is denied, a type of an application whose access is allowed after a terminal device is inquired, an identifier of an application whose access is allowed after a terminal device is inquired, access of an application with an application identifier outside an application identifier list being allowed, access of an application with an application identifier outside an application identifier list being denied, or access of an application with an application identifier outside an application identifier list being allowed after inquiring | One or more of a storage address, whether to hash and store in a blockchain, an allowed local storage time, or whether to encrypt for storage |

It should be noted that hashing in this embodiment of this application refers to encryption in a hash manner. This is uniformly described herein. Details are not described herein again.

S702. The first network element obtains user information of the terminal device according to the user data policy.

within a specific duration, frequency or time ratio based order that the terminal accesses a webpage/content.

The information about the change of the access location of the terminal device may include, for example, that the access location of the terminal device is updated from a tracking area A to a tracking area B.

The information about the data network access point accessed by the terminal device may include, for example, a data network access identifier (DNAI) for access by the terminal device.

The information about the change in the data access point of the terminal device may include, for example, a DNAI for access by a user is changed from a DNAI1 to a DNAI2.

In a possible implementation, when the first network element is a mobility management network element, the user information of the terminal device includes but is not limited to one or more of location information of the terminal device in a first time period, an attachment status of the terminal device, or information about a change in an access location of the terminal device.

In another possible implementation, when the first network element is a session management network element, the user information of the terminal device includes but is not limited to one or more of information about a data network access point accessed by the terminal device, information about a change in a data access point of the terminal device, or content of a network accessed by the terminal device.

S703. The first network element sends the user information of the terminal device to a second network element according to the user data policy.

Optionally, in this embodiment of this application, the first network element may send the user information of the terminal device to the second network element according to the storage policy in the user data policy.

For example, the storage policy may include whether to encrypt for storage. When encryption for storage is required, the first network element may encrypt the user information of the terminal device and send the encrypted user information to the second network element.

Alternatively, for example, the storage policy may include a storage address. When the storage address is an address of the second network element, the first network element may send the user information of the terminal device to the second network element based on the address of the second network element.

It should be noted that, in this embodiment of this application, the collection policy may be empty. The collection policy being empty may mean that when the first network element obtains the user information of the terminal device according to the collection policy, content of the collection policy that is provided by the terminal device and based on which the first network element obtains the user information may be empty, or the user data policy does not include the collection policy. Similarly, the storage policy may also be empty. The storage policy being empty may mean that when the first network element sends the user information of the terminal device to the second network element according to the storage policy, content of the storage policy that is provided by the terminal device and based on which the first network element sends the user information may be empty, or the user data policy does not include the storage policy. In other words, if the collection policy is empty, when obtaining the user information of the terminal device, the first network element may obtain the user information in a default collection manner of the first network element in current technology. In this case, it is also considered that the user information of the terminal device is obtained according to the user data policy in this application. Alternatively, if the storage policy is empty, when sending the user information of the terminal device to the second network element, the first network element may send the user information to the second network element in a default storage policy in current technology. In this case, it is also considered that the user information of the terminal device is sent to the second network element according to the user data policy in this application. This is not limited in this embodiment of this application. Certainly, in this embodiment of this application, the first network element may also collect the user information of the terminal device according to a collection policy preconfigured by an operator on the first network element or a collection policy executed by default on the first network element (for example, a collection policy written in advance into program code of the first network element). Alternatively, the first network element may send the user information of the terminal device to the second network element according to a storage policy preconfigured by an operator on the first network element or a storage policy executed by default on the first network element (for example, a storage policy written in advance into program code of the first network element). This is not limited in this embodiment of this application.

Specific implementation of the foregoing solution is to be described in detail with reference to a specific scenario in the interaction embodiment shown in any one of FIG. 9 to FIG. 15. Details are not described herein again.

In current technology, some of the user information is collected and used with user permission, and other user information is still collected, sold, and used without user awareness, which leads to leakage and even abuse of the user information. Based on the data sharing method provided in this embodiment of this application, in this embodiment of this application, the first network element may obtain the user information of the terminal device according to the user data policy of the terminal device, and send the user information of the terminal device to the second network element according to the user data policy of the terminal device. In other words, in a process of collecting and reporting the user information, the first network element considers the user data policy of the terminal device, thereby really implementing autonomous management of the user information. This is favorable for protection of the user information.

Figure 8:
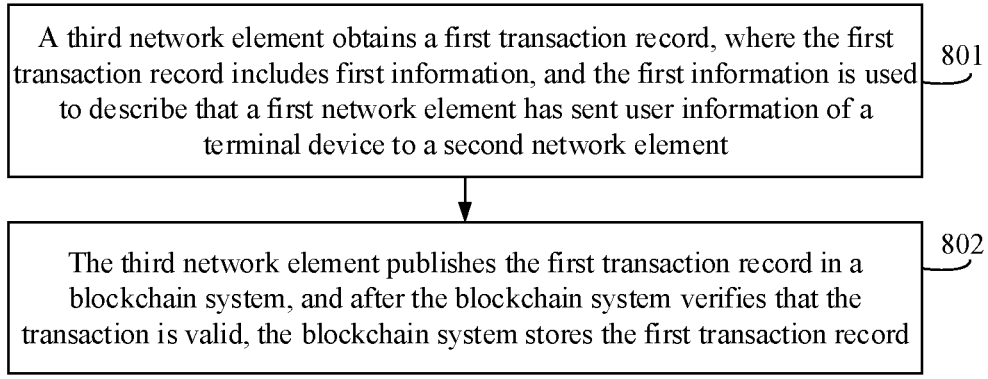
FIG. 8 is a schematic flowchart of a data sharing method according to an embodiment of this application.

FIG. 8 shows a data sharing method according to an embodiment of this application. The method includes the following steps.

S801. A third network element obtains a first transaction record, where the first transaction record includes first information, and the first information is used to indicate that a first network element has sent user information of a terminal device to a second network element.

For related descriptions of the first network element and the third network element, refer to the communication system shown in FIG. 3. Details are not described herein again.

S802. The third network element publishes the first transaction record in a blockchain system, and after the blockchain system verifies that the transaction is valid, the blockchain system stores the first transaction record.

The first information in this embodiment of this application may include a signature of the first network element and an identifier of the second network element. Optionally, the first information may further include one or more of a time at which the user information of the terminal device is sent to the second network element, an address of the second network element, information about whether to encrypt, or hashed user information of the terminal device.

Specific implementation of the foregoing solution is to be described in detail with reference to a specific scenario in the interaction embodiment shown in any one of FIG. 11 to FIG. 14. Details are not described herein again.

Based on the data sharing method provided in this embodiment of this application, the first information used to indicate that the first network element has sent the user information of the terminal device to the second network element is stored in the blockchain system as the first transaction record, thereby ensuring traceability of the user information of the terminal device.

The following further describes the data sharing method provided in the embodiments of this application with reference to FIG. 1 to FIG. 8.

It should be noted that names of messages between network elements, names of parameters in the messages, and the like in the following embodiments of this application are merely examples, and other names may be used in a specific implementation. This is not limited in the embodiments of this application.

It should be noted that interaction between a network element and a blockchain system in the following embodiments of this application may be understood as interaction between the network element and one member node in the blockchain system. For example, that a third-party server sends a subscription request to the blockchain system may be considered as that the third-party server sends the subscription request to one member node in the blockchain system. This is uniformly described herein. Details are not described herein again.

Figure 9:
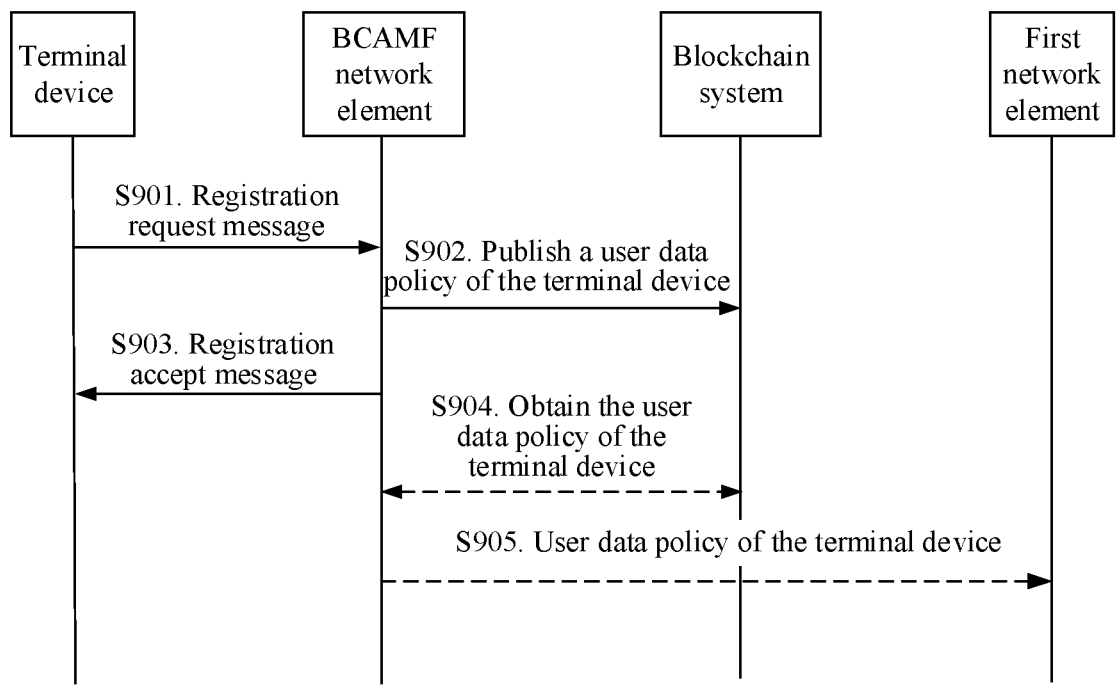
FIG. 9 is a schematic interaction diagram of a data sharing method according to an embodiment of this application.

First, a procedure of delivering the user data policy of the terminal device is provided. As shown in FIG. 9, the procedure includes the following steps.

S901. The terminal device sends a registration request message to the BCAMF network element. Correspondingly, the BCAMF network element receives the registration request message from the terminal device. The registration request message includes a user data policy required after the terminal device successfully registers a subscriber. For related descriptions of the user data policy, refer to the embodiment shown in FIG. 7. Details are not described herein again.

Optionally, in this embodiment of this application, an address of the BCAMF network element may be preconfigured on a blockchain application (APP) of the terminal device. Further, the terminal device may send the registration request message to a corresponding BCAMF network element based on the address of the BCAMF network element. This is not limited in this embodiment of this application.

S902. The BCAMF network element executes another registration procedure based on the registration request message, and publishes the user data policy of the terminal device in the blockchain system.

Optionally, in this embodiment of this application, when the BCAMF network element does not have a BCHF, the BCAMF network element publishes the user data policy of the terminal device in the blockchain system through the BCHF network element. This is uniformly described herein. Details are not described herein again.

S903. The BCAMF network element sends a registration accept message to the terminal device. Correspondingly, the terminal device receives the registration accept message from the BCAMF network element. The registration accept message is used to represent that the user data policy of the terminal device is successfully accepted.

Optionally, in this embodiment of this application, if the BCAMF network element determines that a network cannot accept any user data policy of the terminal device because, for example, there is no communication path to a specified storage device or some user data policies conflict with a network policy/national policy or regulation, the network may accept some of the user data policies or reject all the user data policies of the terminal device. Correspondingly, in this case, the registration accept message may include an accepted user data policy and/or a rejected user data policy.

Optionally, in this embodiment of this application, when the user data policy of the terminal device changes, for example, location information of the terminal device changes from statistics allowed to statistics denied, the user data policy of the terminal device may be updated in the manner described in steps S901 to S903, and further, an updated user data policy is published in the blockchain system. For related descriptions, refer to the foregoing steps S901 to S903. Details are not described herein again.

Optionally, in this embodiment of this application, the terminal device may also directly interact with the blockchain system by using the blockchain APP preconfigured on the terminal device, to publish the user data policy of the terminal device (including an original user data policy and an updated user data policy) in the blockchain system. This is not limited in this embodiment of this application.

Optionally, as shown in FIG. 9, the data sharing method provided in this embodiment of this application may further include the following steps.

S904. After the terminal device attaches to the network, the BCAMF network element obtains the user data policy of the terminal device from the blockchain system.

Optionally, in this embodiment of this application, when the BCAMF network element does not have a BCHF, the BCAMF network element obtains the user data policy of the terminal device from the blockchain system through the BCHF network element. This is uniformly described herein. Details are not described herein again.

S905. The BCAMF network element sends the user data policy of the terminal device to the first network element. Correspondingly, the first network element receives the user data policy from the BCAMF network element.

A 5G communication system is used as an example. The first network element herein may be, for example, an AMF network element or an SMF network element.

For example, the user data policy sent by the BCAMF network element to the first network element may include, for example, a collection policy. For example, the collection policy may be always collecting a moving track of the terminal device.

Optionally, in this embodiment of this application, after the first network element requests the user data policy of the terminal device from the BCAMF network element, the BCAMF network element may obtain the user data policy of the terminal device from the blockchain system, and further send the user data policy to the first network element. Alternatively, after learning that the terminal device has been attached to the network, the BCAMF network element actively obtains the user data policy of the terminal device from the blockchain system, and further sends the user data policy to the first network element. A manner in which the BCAMF network element delivers the user data policy of the terminal device to the first network element is not limited in this embodiment of this application.

In current technology, some of the user information is collected and used with user permission, and other user information is still collected, sold, and used without user awareness, which leads to leakage and even abuse of the user information. However, in this embodiment of this application, the terminal device may report the user data policy by itself, so that the blockchain system or the first network element obtains the user data policy of the terminal device. Further, the user data policy of the terminal device may be considered during subsequent processing of the user information, thereby really implementing autonomous management of user information. This is favorable for protection of the user information. In addition, in this embodiment of this application, because the user data policy of the terminal device is stored in the blockchain system and is irrelevant to an operator that merely serves the terminal device, a third party does not need to independently negotiate with the operator, to subscribe to user information subscription and query services. The operator does not need to enable an interface for each third party to subscribe to and query user information, and does not need to verify whether a network element that requests the user information has permission. Instead, the blockchain system performs unified processing, thereby simplifying technical and implementation complexity of information sharing between participants.

The actions of the terminal device or the BCAMF network element in steps S901 to S905 may be performed by the processor 601 in the communication device 600 shown in FIG. 6 by invoking the application program code stored in the memory 603. This is not limited in this embodiment.

Figure 10:
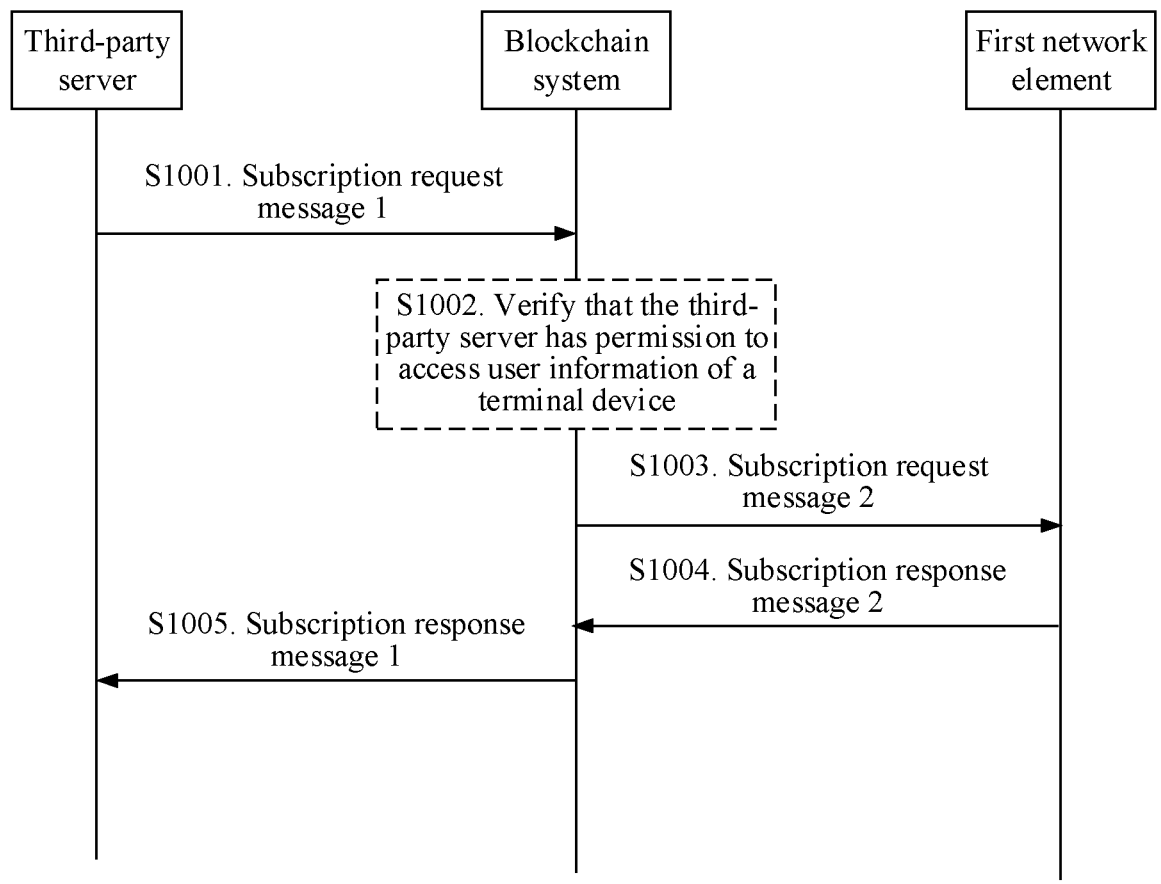
FIG. 10 is a schematic interaction diagram of a data sharing method according to an embodiment of this application.

The following describes a procedure of subscribing to the user information of the terminal device. As shown in FIG. 10, the procedure includes the following steps.

S1001. The third-party server sends a subscription request message 1 to the blockchain system. Correspondingly, the blockchain system receives the subscription request message 1 from the third-party server. The subscription request message 1 is used to subscribe to the user information of the terminal device.

A 5G communication system is used as an example. The first network element herein may be, for example, an AMF network element or an SMF network element.

Optionally, in this embodiment of this application, the subscription request message 1 includes but is not limited to one or more of an identifier of the terminal device, an identifier of the third-party server, whether to encrypt for storage, a list of subscribed user information, a reporting address of the user information, or a reporting manner of the user information.

Optionally, in this embodiment of this application, the identifier of the terminal device may be, for example, a subscription permanent identifier (SUPI), an international mobile subscriber identity (IMSI), a mobile station integrated services digital network number (MSISDN), or a global unique temporary identifier (GUTI). This is not limited in this embodiment of this application.

Optionally, in this embodiment of this application, the list of the subscribed user information includes but is not limited to one or more of an access technology of the terminal device, a location of the terminal device, a moving track of the terminal device, or content of a network accessed by the terminal device.

Optionally, in this embodiment of this application, the storage address of the user information may be an address of an information collector, for example, an address of the third-party server in this embodiment of this application. Alternatively, the storage address of the user information may be an address of a storage server specified by the third-party server. This is not limited in this embodiment of this application.

Optionally, in this embodiment of this application, the reporting manner of the user information includes but is not limited to one or more of real-time reporting or periodic reporting. Certainly, when the reporting manner of the user information is periodic reporting, the subscription request message 1 may further include a reporting period. This is not limited in this embodiment of this application.

Optionally, in this embodiment of this application, when the third-party server does not have a BCHF, the third-party server sends the subscription request message 1 to the blockchain system through the BCHF network element. Correspondingly, the blockchain system receives the subscription request message 1 from the third-party server through the BCHF network element. This is uniformly described herein. Details are not described herein again.

S1002. The blockchain system verifies, according to the user data policy, that the third-party server has permission to access the user information of the terminal device.

In a possible implementation, that the blockchain system verifies, according to the user data policy, that the third-party server has permission to access the user information of the terminal device includes that the blockchain system verifies, according to an access policy in the user data policy, that the third-party server has permission to access the user information of the terminal device. For example, if the access policy includes an ID of an application whose access is allowed, and the ID of the application whose access is allowed includes an application ID corresponding to the third-party server, the blockchain system may determine that the third-party server has permission to access the user information of the terminal device.

It should be noted that step S1002 in this embodiment of this application is an optional step. Alternatively, after receiving the subscription request message 1, the blockchain system may directly perform an action of the blockchain system in step S1003. This is not limited in this embodiment of this application.

S1003. The blockchain system sends a subscription request message 2 to the first network element. Correspondingly, the first network element receives the subscription request message 2 from the blockchain system. The subscription request message 2 is used to subscribe to the user information of the terminal device.

For related descriptions of the subscription request message 2, refer to the foregoing subscription request message 1. Details are not described herein again.

Optionally, in this embodiment of this application, when the first network element does not have a BCHF, the blockchain system sends the subscription request message 2 to the first network element through the BCHF network element. The first network element receives the subscription request message 2 from the blockchain system through the BCHF network element. This is uniformly described herein. Details are not described herein again.

Optionally, a 5G communication system is used as an example. In this embodiment of this application, the blockchain system or the BCHF network element may alternatively interact with the first network element through forwarding by the NEF network element. This is not limited in this embodiment of this application.

Optionally, in this embodiment of this application, when the first network element has a BCHF, it may be considered that the first network element can directly interact with the blockchain system. In this case, an address of the first network element or an address of the NEF network element may be obtained by querying a blockchain record. Alternatively, when the first network element has a BCHF, and the BCHF network element interacts with the first network element through the NEF network element, an address of the NEF network element may be determined by the BCHF network element. This is uniformly described herein. Details are not described herein again.

S1004. The first network element sends a subscription response message 2 to the blockchain system. Correspondingly, the blockchain system receives the subscription response message 2 from the first network element.

Optionally, in this embodiment of this application, when the first network element does not have a BCHF, the first network element sends the subscription response message 2 to the blockchain system through the BCHF network element. The blockchain system receives the subscription response message 2 from the first network element through the BCHF network element. This is uniformly described herein. Details are not described herein again.

S1005. The blockchain system sends a subscription response message 1 to the third-party server. Correspondingly, the third-party server receives the subscription response message 1 from the blockchain system.

Optionally, in this embodiment of this application, when the third-party server does not have a BCHF, the blockchain system sends the subscription response message 1 to the third-party server through the BCHF network element. Correspondingly, the third-party server receives the subscription response message 1 from the blockchain system through the BCHF network element. This is uniformly described herein. Details are not described herein again.

It should be noted that, in this embodiment of this application, description is provided based on an example in which after receiving the subscription request message 1, the blockchain system continues to send the subscription request message 2 to the first network element to subscribe to the user information of the terminal device. Optionally, in this embodiment of this application, after the blockchain system receives the subscription request message 1, or after the BCHF network element or the NEF network element between the blockchain system and the first network element receives the subscription request message 2, the first network element may be notified, so that the first network element can obtain a related subscription event. This is not limited in this embodiment of this application.

It should be noted that, in this embodiment of this application, description is provided based on an example in which the third-party server subscribes to the user information of the terminal device from the first network element (for example, an AMF network element or an SMF network element in a 5G network). Certainly, the third-party server may alternatively subscribe to the user information of the terminal device from another network element in the network, for example, a UDR network element in the 5G network. This is uniformly described herein. Details are not described herein again.

This embodiment of this application provides a manner in which the third-party server subscribes to the user information of the terminal device through the blockchain system. Permission of the third-party server to access the user information of the terminal device may be verified through the blockchain system. This is favorable for protection of the user information.

The actions of the third-party server, the first network element, or the blockchain system in steps S1001 to S1005 may be performed by the processor 601 in the communication device 600 shown in FIG. 6 by invoking the application program code stored in the memory 603. This is not limited in this embodiment.

Figure 11:
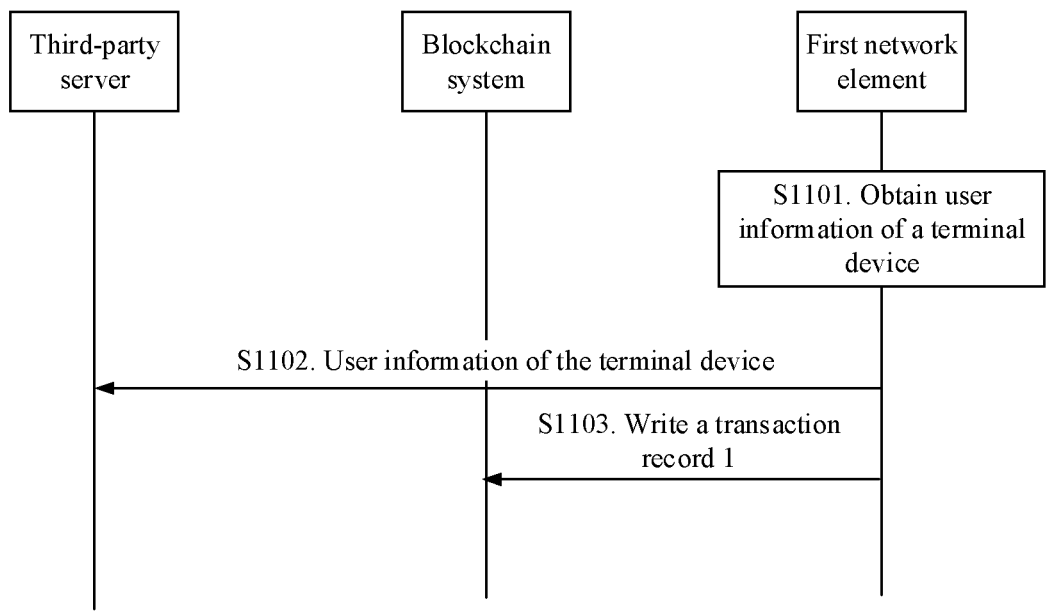
FIG. 11 is a schematic interaction diagram of a data sharing method according to an embodiment of this application.

Based on the subscription manner of the user information of the terminal device shown in FIG. 10, that the second network element in the communication system shown in FIG. 2 is the third-party server in FIG. 10 is used as an example. As shown in FIG. 11, a data sharing method provided in an embodiment of this application includes the following steps.

S1101. The first network element obtains user information of a terminal device according to a user data policy of the terminal device.

For specific implementation of step S1101, refer to step S702 in the embodiment shown in FIG. 7. Details are not described herein again.

It should be noted that, in this embodiment of this application, the user information of the terminal device collected by the first network element may be information in the list of the subscribed user information in the embodiment shown in FIG. 10, or may include some of information in the list of the subscribed user information in the embodiment shown in FIG. 10. This is not limited in this embodiment of this application.

It should be noted that, in the procedure of subscribing to the user information of the terminal device shown in FIG. 10, the third-party server subscribes to the user information of the terminal device not from the first network element but from another network element, for example, the UDR network element in the 5G network. In this case, the first network element may receive the user information of the terminal device from the UDR network element. This is not limited in this embodiment of this application.

S1102. The first network element sends the user information of the terminal device to the third-party server according to the user data policy of the terminal device.

For specific implementation of step S1102, refer to step S703 in the embodiment shown in FIG. 7. Details are not described herein again.

Optionally, in this embodiment of this application, after obtaining a subscription event of the third-party server, the first network element may send the user information of the terminal device to the third-party server based on a reporting address of the user information (herein, the address of the third-party server). Alternatively, after obtaining a subscription event of the third-party server, the first network element first temporarily stores the obtained user information of the terminal device in the first network element. When the third server queries the user information of the terminal device from the first network element, the first network element sends the user information of the terminal device to the third-party server according to the user data policy of the terminal device. This is not limited in this embodiment of this application.

Optionally, in this embodiment of this application, the first network element may send the user information of the terminal device to the third-party server based on the reporting address of the user information (for example, the address of the third-party server) included in the subscription request message 1. Alternatively, the first network element may send the user information of the terminal device to the third-party server based on an address in the storage policy (for example, may be the address of the third-party server). This is not limited in this embodiment of this application.

Optionally, in this embodiment of this application, after obtaining the user information of the terminal device, the third-party server may store the user information of the terminal device. This is not limited in this embodiment of this application.

S1103. The first network element writes a transaction record 1 into the blockchain system, and after the blockchain system verifies that the transaction is valid, the blockchain system stores the transaction record 1.

The transaction record 1 includes information 1, and the information 1 is used to indicate that the first network element has sent the user information of the terminal device to the third-party server.

Optionally, the information 1 in this embodiment of this application includes a signature of the first network element and an identifier of the third-party server. In addition, the information 1 in this embodiment of this application further includes but is not limited to one or more of a time at which the user information of the terminal device is sent to the third-party server or an address of the third-party server.

It should be noted that the transaction record 1 in this embodiment of this application may also be referred to as a first transaction record, and the information 1 in this embodiment of this application may also be referred to as first information. This is uniformly described herein. Details are not described herein again.

Based on the data sharing method provided in this embodiment of this application, the third-party server can obtain the user information of the terminal device. In addition, the information 1 used to indicate that the first network element has sent the user information of the terminal device to the third-party server is stored in the blockchain system as the transaction record 1, thereby ensuring traceability of the user information of the terminal device.

The actions of the first network element, the third-party server, or the blockchain system in steps S1101 to S1103 may be performed by the processor 601 in the communication device 600 shown in FIG. 6 by invoking the application program code stored in the memory 603. This is not limited in this embodiment.

Figure 12:
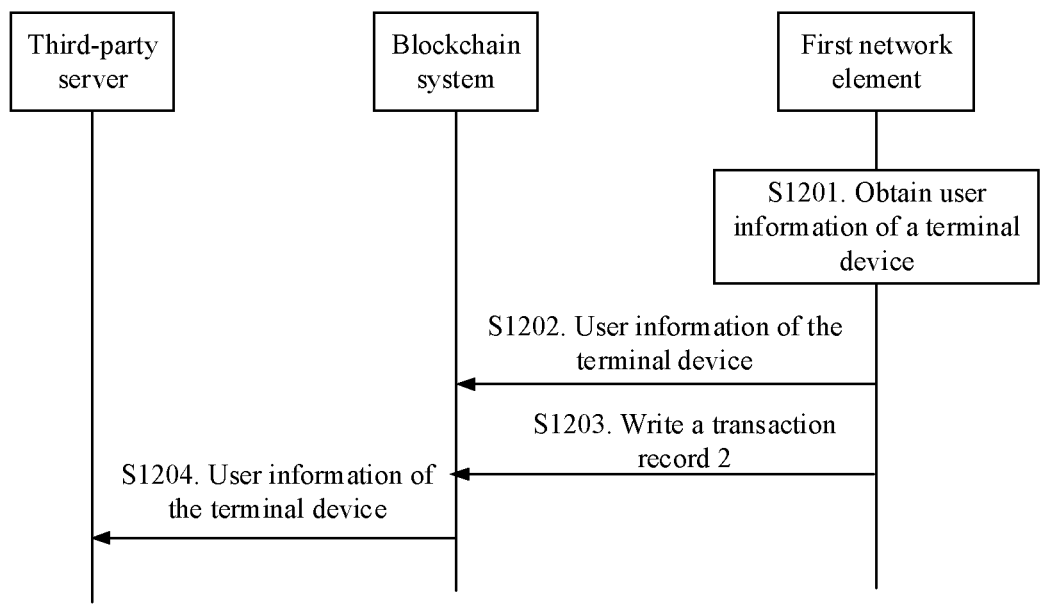
FIG. 12 is a schematic interaction diagram of a data sharing method according to an embodiment of this application.

Based on the subscription manner of the user information of the terminal device shown in FIG. 10, that the second network element in the communication system shown in FIG. 2 is the third-party server in FIG. 10 is used as an example. As shown in FIG. 12, another data sharing method provided in an embodiment of this application includes the following steps.

S1201. This step is the same as step S1101 in the embodiment shown in FIG. 11. For related descriptions, refer to the embodiment shown in FIG. 11. Details are not described herein again.

S1202. The first network element sends the user information of the terminal device to the blockchain system. Correspondingly, the blockchain system receives the user information of the terminal device from the first network element.

Similar to the subscription procedure shown in FIG. 10, when the first network element does not have a BCHF, the first network element sends the user information of the terminal device to the blockchain system through the BCHF network element. Correspondingly, the blockchain system receives the user information of the terminal device from the first network element through the BCHF network element. This is uniformly described herein. Details are not described herein again.

Optionally, a 5G communication system is used as an example. In this embodiment of this application, the blockchain system or the BCHF network element may alternatively interact with the first network element through forwarding by the NEF network element. This is not limited in this embodiment of this application.

Optionally, in this embodiment of this application, the first network element may send the user information of the terminal device to the blockchain system according to the storage policy in the user data policy of the terminal device. For example, if the storage policy requires hashing for storage, the first network element may send the user information of the terminal device to the blockchain system after hashing the user information.

Optionally, in this embodiment of this application, after obtaining a subscription event of the third-party server, the first network element may send the user information of the terminal device to the blockchain system. Alternatively, after obtaining a subscription event of the third-party server, the first network element first temporarily stores the obtained user information of the terminal device in the first network element. When the third server queries the user information of the terminal device from the first network element, the first network element sends the user information of the terminal device to the blockchain system. This is not limited in this embodiment of this application.

S1203. The first network element writes a transaction record 2 into the blockchain system, and after the blockchain system verifies that the transaction is valid, the blockchain system stores the transaction record 2.

The transaction record 2 includes information 2, and the information 2 is used to indicate that the first network element has sent the user information of the terminal device to the third-party server.

Optionally, the information 2 in this embodiment of this application includes a signature of the first network element and an identifier of the third-party server. In addition, the information 2 in this embodiment of this application further includes but is not limited to one or more of a time at which the user information of the terminal device is sent to the third-party server or an address of the third-party server.

It should be noted that the transaction record 2 in this embodiment of this application may also be referred to as a first transaction record, and the information 2 in this embodiment of this application may also be referred to as first information. This is uniformly described herein. Details are not described herein again.

Optionally, in this embodiment of this application, when the first network element sends the user information of the terminal device to the blockchain system after hashing the user information, if the blockchain system may decrypt, based on a third party identity by using a preset secret key, the hashed user information to obtain a corresponding plaintext, the blockchain system may record the transaction in which the third-party server obtains the user information of the terminal device. This is not limited in this embodiment of this application.

S1204. The blockchain system sends the user information of the terminal device to the third-party server. Correspondingly, the third-party server receives the user information of the terminal device from the blockchain system.

Optionally, in this embodiment of this application, when the third-party server does not have a BCHF, the blockchain system sends the user information of the terminal device to the third-party server through the BCHF network element. Correspondingly, the third-party server receives the user information of the terminal device from the blockchain system through the BCHF network element. This is uniformly described herein. Details are not described herein again.

Optionally, in this embodiment of this application, the blockchain system may send the user information of the terminal device to the third-party server based on the reporting address of the user information (for example, the address of the third-party server) included in the subscription request message 1. Alternatively, the blockchain system may send the user information of the terminal device to the third-party server based on an address in the storage policy (for example, the address of the third-party server). This is not limited in this embodiment of this application.

Optionally, in this embodiment of this application, after obtaining the user information of the terminal device, the third-party server may store the user information of the terminal device. This is not limited in this embodiment of this application.

Based on the data sharing method provided in this embodiment of this application, the third-party server can obtain the user information of the terminal device. In addition, the information 2 used to indicate that the first network element has sent the user information of the terminal device to the third-party server is stored in the blockchain system as the transaction record 2, thereby ensuring traceability of the user information of the terminal device.

The actions of the first network element, the third-party server, or the blockchain system in steps S1201 to S1204 may be performed by the processor 601 in the communication device 600 shown in FIG. 6 by invoking the application program code stored in the memory 603. This is not limited in this embodiment.

Figure 13:
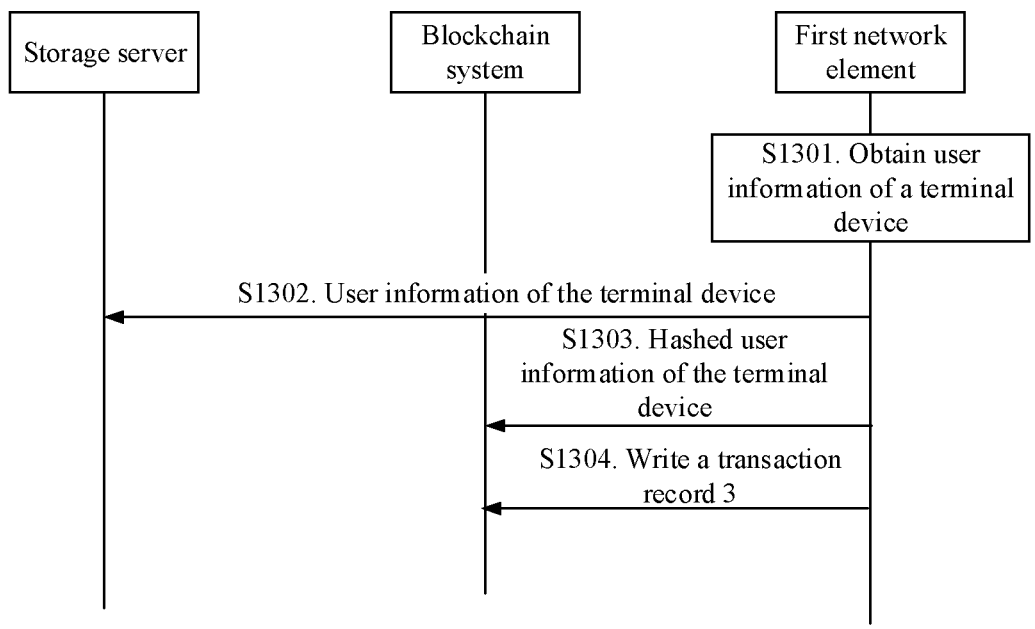
FIG. 13 is a schematic interaction diagram of a data sharing method according to an embodiment of this application.

Based on the subscription manner of the user information of the terminal device shown in FIG. 10, that the second network element in the communication system shown in FIG. 2 is the storage server in FIG. 10 is used as an example. As shown in FIG. 13, another data sharing method provided in an embodiment of this application includes the following steps.

S1301. This step is the same as step S1101 in the embodiment shown in FIG. 11. For related descriptions, refer to the embodiment shown in FIG. 11. Details are not described herein again.

S1302. The first network element sends the user information of the terminal device to the storage server according to the user data policy of the terminal device.

For specific implementation of step S1302, refer to step S703 in the embodiment shown in FIG. 7. Details are not described herein again.

Optionally, in this embodiment of this application, the first network element may send the user information of the terminal device to the storage server based on the reporting address of the user information (for example, the address of the storage server) included in the subscription request message 1. Alternatively, the first network element may send the user information of the terminal device to the storage server based on an address in the storage policy (for example, the address of the storage server). This is not limited in this embodiment of this application.

Optionally, in this embodiment of this application, after obtaining the user information of the terminal device, the storage server may store the user information of the terminal device. This is not limited in this embodiment of this application.

S1303. The first network element stores the user information of the terminal device into the blockchain system after hashing the user information.

Optionally, the hashed user information of the terminal device is used to subsequently verify whether the user information of the terminal device stored in the storage server is tampered with.

On one hand, hash processing is performed on the user information of the terminal device stored in the blockchain system. This helps protect the user information of the terminal device from being disclosed. On the other hand, in this embodiment of this application, the user information of the terminal device is stored in the blockchain system, and subsequently, the blockchain system may uniformly notify a user of the user information of the terminal device and record the notification. Compared with a current manner of point-to-point transmission of the user information by a 5G network element, this information transmission method is more efficient.

S1304. The first network element writes a transaction record 3 into the blockchain system, and after the blockchain system verifies that the transaction is valid, the blockchain system stores the transaction record 3.

The transaction record 3 includes information 3, and the information 3 is used to indicate that the first network element has sent the user information of the terminal device to the storage server.

Optionally, the information 3 in this embodiment of this application includes a signature of the first network element and an identifier of the storage server. In addition, the information 3 in this embodiment of this application further includes but is not limited to one or more of a time at which the user information of the terminal device is sent to the third-party server, an address of the third-party server, or hashed user information of the terminal device.

It should be noted that the transaction record 3 in this embodiment of this application may also be referred to as a first transaction record, and the information 3 in this embodiment of this application may also be referred to as first information. This is uniformly described herein. Details are not described herein again.

Based on the data sharing method provided in this embodiment of this application, the storage server can obtain the user information of the terminal device. In addition, the information 3 used to indicate that the first network element has sent the user information of the terminal device to the storage server is stored in the blockchain system as the transaction record 3, thereby ensuring traceability of the user information of the terminal device.

The actions of the first network element, the storage server, or the blockchain system in steps S1301 to S1304 may be performed by the processor 601 in the communication device 600 shown in FIG. 6 by invoking the application program code stored in the memory 603. This is not limited in this embodiment.

It should be noted that the data sharing methods shown in FIG. 11 to FIG. 13 are described based on the subscription manner of the user information of the terminal device shown in FIG. 10. Certainly, the data sharing methods shown in FIG. 11 to FIG. 13 may be decoupled from the subscription manner of the user information of the terminal device shown in FIG. 10. In other words, the data sharing methods shown in FIG. 11 to FIG. 13 may be alternatively based on another subscription manner of the user information of the terminal device. Alternatively, the data sharing methods shown in FIG. 11 to FIG. 13 may not be triggered based on a subscription scenario. Instead, after obtaining the user information of the terminal device, the first network element actively stores the user information of the terminal device to the third-party server or the storage server according to the storage policy in the user data policy of the terminal device. This is not limited in this embodiment of this application.

Figure 14:
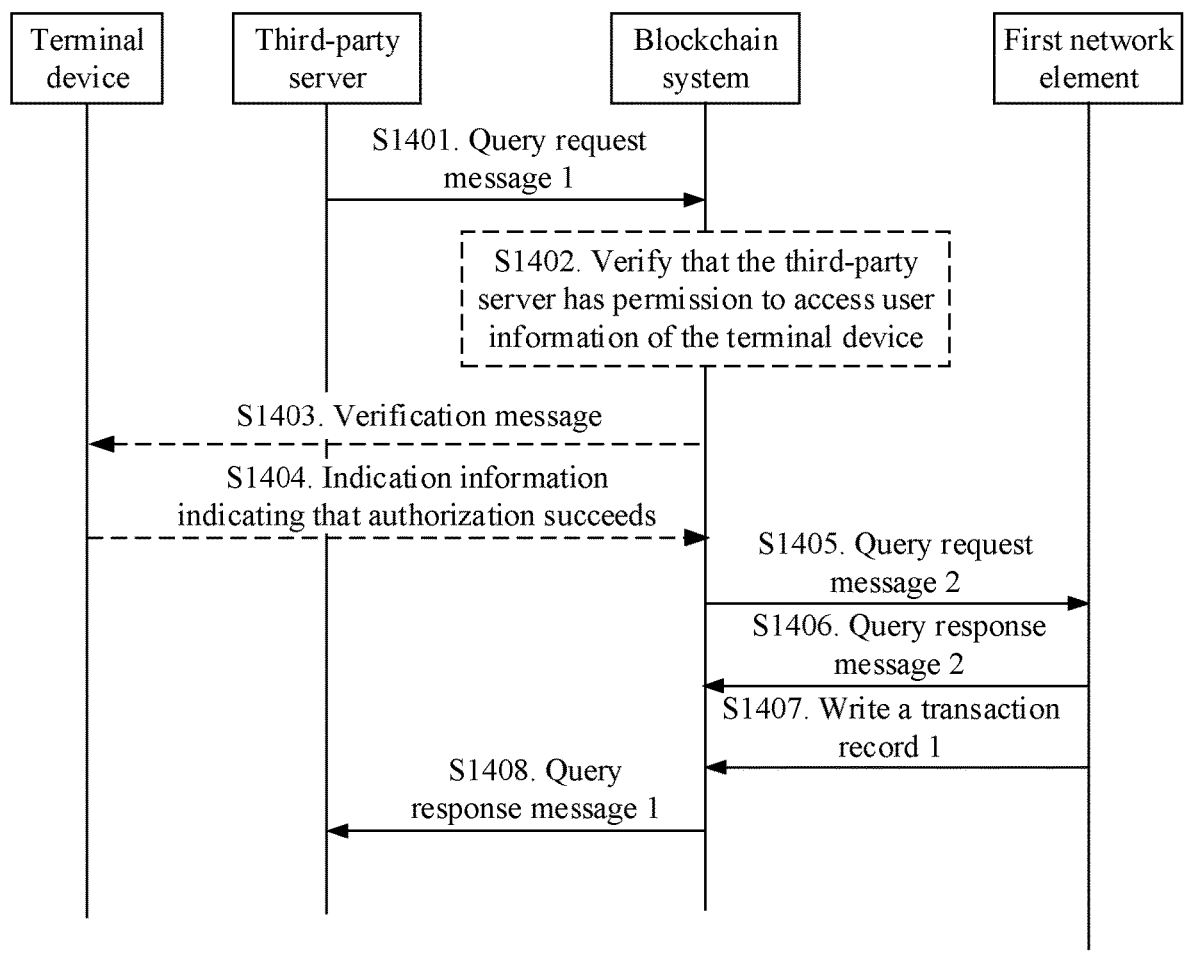
FIG. 14 is a schematic interaction diagram of a data sharing method according to an embodiment of this application.

The communication system shown in FIG. 3 is used as an example. As shown in FIG. 14, still another data sharing method provided in an embodiment of this application includes the following steps.

S1401. The third-party server sends a query request message 1 to the blockchain system. Correspondingly, the blockchain system receives the query request message 1 from the third-party server.

The query request message 1 carries an identifier of the terminal device and a description of to-be-queried user information of the terminal device, for example, current location information of the terminal device and a moving track of the terminal device in a period of time.

Optionally, the query request message 1 may further carry a purpose of to-be-queried user information of the terminal device. This is not limited in this embodiment of this application.

Optionally, in this embodiment of this application, the description of the to-be-queried user information of the terminal device may be identified by an information element in the query request message 1. Alternatively, in this embodiment of this application, the description of the to-be-queried user information of the terminal device may be identified by a message name itself. For example, the foregoing query request message 1 is replaced with query terminal device location information (query user equipment (UE) location information) request message 1. This is not limited in this embodiment of this application.

Optionally, in this embodiment of this application, when the third-party server does not have a BCHF, the third-party server sends the query request message 1 to the blockchain system through the BCHF network element. Correspondingly, the blockchain system receives the query request message 1 from the third-party server through the BCHF network element. This is uniformly described herein. Details are not described herein again.

It should be noted that the third-party server in this embodiment of this application may be the same as the third server in the embodiments shown in FIG. 10 to FIG. 13. The third-party server in this embodiment of this application may alternatively be different from the third server in the embodiments shown in FIG. 10 to FIG. 13. For example, the third server in the embodiments shown in FIG. 10 to FIG. 13 may be a WECHAT server, and the server in this embodiment of this application may be a Tencent server. This is not limited in this embodiment of this application.

S1402. The blockchain system verifies, according to the user data policy, that the third-party server has permission to access the user information of the terminal device.

For related descriptions of step S1402, refer to step S1002 in the embodiment shown in FIG. 10. Details are not described herein again.

It should be noted that step S1402 in this embodiment of this application is an optional step. Alternatively, after receiving the subscription request message 1, the blockchain system may directly perform an action of the blockchain system in step S1403. This is not limited in this embodiment of this application.

S1403. When the user data policy of the terminal device that is stored in the blockchain system includes an access policy, and the access policy is access after inquiring the terminal device, the blockchain system sends a verification message to the terminal device. Correspondingly, the terminal device receives the verification message from the blockchain system. The verification message is used to verify whether the third-party server is allowed to access the user information of the terminal device.

Optionally, the verification message in this embodiment of this application includes but is not limited to one or more of an identifier of the third-party server or an identifier of a third-party application corresponding to the third-party server, a description of to-be-queried user information of the terminal device, and a purpose of to-be-queried user information of the terminal device.

S1404. The terminal device sends, to the blockchain system, indication information indicating that authorization succeeds. Correspondingly, the blockchain system receives, from the terminal device, the indication information indicating that authorization succeeds.

S1405. The blockchain system sends a query request message 2 to the first network element. Correspondingly, the first network element receives the query request message 2 from the blockchain system.

For related descriptions of the query request message 2, refer to the foregoing query request message 1. Details are not described herein again.

Optionally, in this embodiment of this application, when the first network element does not have a BCHF, the blockchain system sends the query request message 2 to the first network element through the BCHF network element. The first network element receives the query request message 2 from the blockchain system through the BCHF network element. This is uniformly described herein. Details are not described herein again.

Optionally, a 5G communication system is used as an example. In this embodiment of this application, the blockchain system or the BCHF network element may alternatively interact with the first network element through forwarding by the NEF network element. This is not limited in this embodiment of this application.

Optionally, in this embodiment of this application, when the first network element has a BCHF, it may be considered that the first network element can directly interact with the blockchain system. In this case, an address of the first network element or an address of the NEF network element may be obtained by querying a blockchain record. Alternatively, when the first network element has a BCHF, and the BCHF network element interacts with the first network element through the NEF network element, an address of the NEF network element may be determined by the BCHF network element. This is uniformly described herein. Details are not described herein again.

S1406. The first network element sends a query response message 2 to the blockchain system. Correspondingly, the blockchain system receives the query response message 2 from the first network element. The query response message 2 carries the user information of the terminal device.

For related implementation of obtaining, by the first network element, the user information of the terminal device, refer to step S1101 in the embodiment shown in FIG. 11. Details are not described herein again.

Optionally, in this embodiment of this application, when the first network element does not have a BCHF, the first network element sends the query response message 2 to the blockchain system through the BCHF network element. The blockchain system receives the query response message 2 from the first network element through the BCHF network element. This is uniformly described herein. Details are not described herein again.

S1407. This step is the same as step S1103 in the embodiment shown in FIG. 11. For related descriptions, refer to the embodiment shown in FIG. 11. Details are not described herein again.

The information 1 used to indicate that the first network element has sent the user information of the terminal device to the third-party server is stored in the blockchain system as the transaction record 1, thereby ensuring traceability of the user information of the terminal device.

S1408. The blockchain system sends a query response message 1 to the third-party server. Correspondingly, the third-party server receives the query response message 1 from the blockchain system. The query response message 1 carries the user information of the terminal device.

Optionally, in this embodiment of this application, when the third-party server does not have a BCHF, the blockchain system sends the query response message 1 to the third-party server through the BCHF network element. Correspondingly, the third-party server receives the query response message 1 from the blockchain system through the BCHF network element. This is uniformly described herein. Details are not described herein again.

Optionally, in this embodiment of this application, when the blockchain system or the first network element sends, according to the storage policy in the user data policy of the terminal device, the user information of the terminal device to the third-party server after encrypting the user information of the terminal device, the third-party server may obtain the user information of the terminal device, and then decrypt the user information of the terminal device by using an agreed secret key. This is uniformly described herein. Details are not described herein again.

Optionally, this embodiment of this application may be applicable to obtaining the user information of the terminal device in a scenario in which the user information of the terminal device is real-time information. For example, the user information of the terminal device is a current location of the terminal device, a network attachment status, or a quality of service (QoS) parameter of an ongoing service. Such information is generally valid only at that time, and has little value after expiration, such that storage is not necessary. This is uniformly described herein. Details are not described herein again.

In current technology, some of the user information is collected and used with user permission, and other user information is still collected, sold, and used without user awareness, which leads to leakage and even abuse of the user information. Based on the data sharing method provided in this embodiment of this application, in this embodiment of this application, when the third-party server queries the user information of the terminal device, the blockchain system may obtain the user information of the terminal device from the first network element after verifying, according to the user data policy of the terminal device, that the third-party server has permission to access the user information of the terminal device. In other words, when the third-party server needs to obtain the user information of the terminal device, the third network element considers the user data policy of the terminal device, and obtains the user information of the terminal device from the first network element only after verifying that the third-party server has permission to access the user information of the terminal device, thereby really implementing autonomous management of the user information. This is favorable for protection of the user information.

The actions of the first network element, the third-party server, or the blockchain system in steps S1401 to S1408 may be performed by the processor 601 in the communication device 600 shown in FIG. 6 by invoking the application program code stored in the memory 603. This is not limited in this embodiment.

Figure 15:
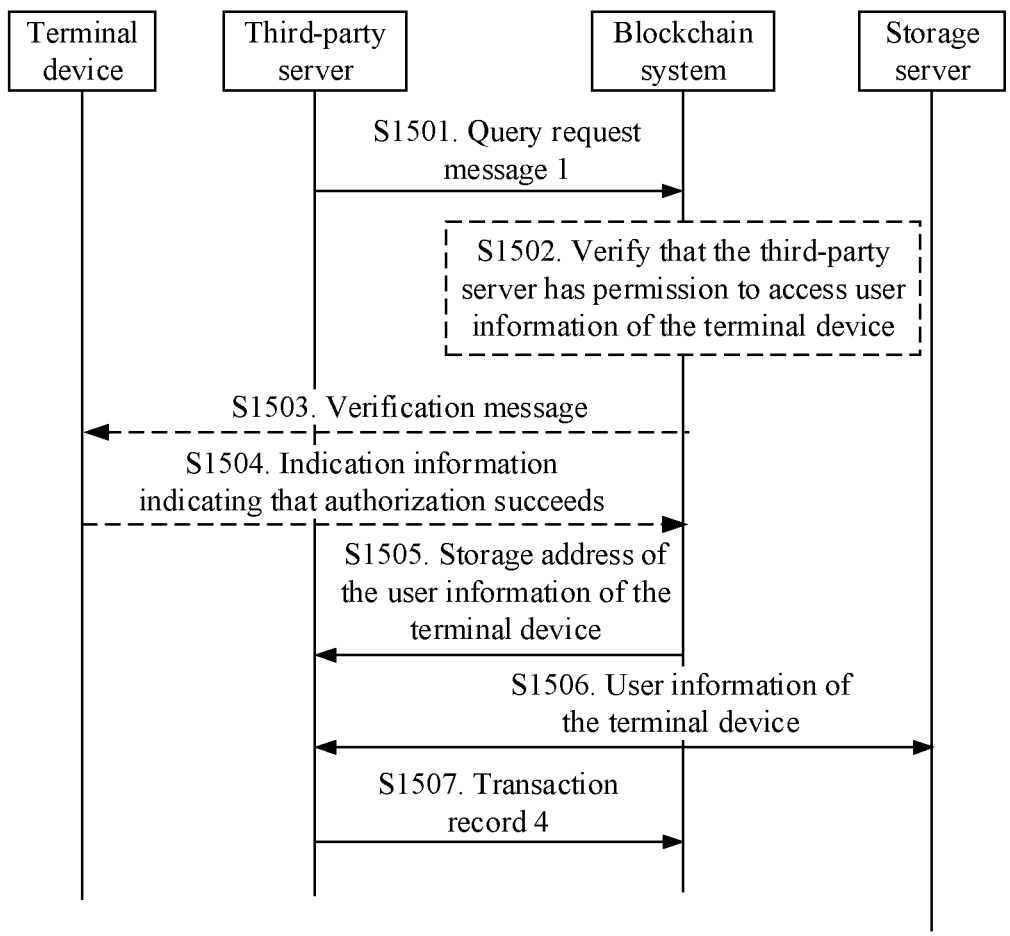
FIG. 15 is a schematic interaction diagram of a data sharing method according to an embodiment of this application.

The communication system shown in FIG. 3 is used as an example. As shown in FIG. 15, still another data sharing method provided in an embodiment of this application includes the following steps.

S1501 to S1504. These steps are the same as steps S1401 to S1404 in the embodiment shown in FIG. 14. For related descriptions, refer to the embodiment shown in FIG. 14. Details are not described herein again.

S1505. The blockchain system sends a storage address of the user information of the terminal device to the third-party server. Correspondingly, the third-party server receives the storage address of the user information of the terminal device from the blockchain system.

Optionally, in this embodiment of this application, the blockchain system may further send, to the third-party server, one or more of hashed user information of the terminal device or an information access password. Correspondingly, the third-party server receives, from the blockchain system, the one or more of the hashed user information of the terminal device or the information access password.

Optionally, in this embodiment of this application, when the third-party server does not have a BCHF, the blockchain system sends the foregoing information to the third-party server through the BCHF network element. Correspondingly, the third-party server receives the foregoing information from the blockchain system through the BCHF network element. This is uniformly described herein. Details are not described herein again.

Optionally, in this embodiment of this application, after the blockchain system sends the foregoing information to the third server, the blockchain system may further record the transaction as a transaction record. The transaction record may include, for example, one or more of a visitor identifier (herein, an identifier of the third-party server or an identifier of a third-party application corresponding to the third-party server), access content, or an access time, thereby ensuring traceability of the user information of the terminal device.

S1506. The third-party server obtains the user information of the terminal device from a corresponding storage server based on the storage address of the user information of the terminal device.

Optionally, in this embodiment of this application, when the third-party server obtains the information access password, the third-party server may obtain the user information of the terminal device from a corresponding storage server based on the access password, thereby ensuring access security of the user information of the terminal device.

Optionally, in this embodiment of this application, when the third-party server obtains the hashed user information of the terminal device, the third-party server may verify, based on the hashed user information of the terminal device, whether the user information of the terminal device obtained from the storage server is tampered with. For example, after hashing the user information of the terminal device obtained from the storage server, the third-party server compares the hashed user information obtained from the storage server with the hashed user information of the terminal device obtained from the blockchain system. If the hashed user information obtained from the storage server is the same as the hashed user information obtained from the blockchain system, it may prove that the user information is not tampered with. Otherwise, it may be considered that the user information of the terminal device is tampered with.

S1507. The third-party server writes a transaction record 4 into the blockchain system, and after the blockchain system verifies that the transaction is valid, the blockchain system stores the transaction record 4.

The transaction record 4 includes information 4, and the information 4 is used to indicate that the storage server has sent the user information of the terminal device to the third-party server.

Optionally, the information 4 in this embodiment of this application includes a signature of the third-party server and an identifier of the storage server. In addition, the information 4 in this embodiment of this application further includes but is not limited to one or more of a time at which the user information of the terminal device is obtained from the storage server or information about whether the user information of the terminal device is encrypted.

It should be noted that the transaction record 4 in this embodiment of this application may also be referred to as a third transaction record, and the information 4 in this embodiment of this application may also be referred to as third information. This is uniformly described herein. Details are not described herein again.

Optionally, this embodiment of this application may be applicable to a scenario in which the user information of the terminal device is statistical information of the terminal device. Generally, the information is worth storing, and generally needs to be stored in the storage server. This is uniformly described herein. Details are not described herein again.

Based on the data sharing method provided in this embodiment of this application, in this embodiment of this application, when the third-party server queries the user information of the terminal device, the third-party server may obtain the storage address of the user information of the terminal device from the blockchain system, and further, the third-party server obtains the user information of the terminal device from a storage server corresponding to the storage address. In other words, when the third-party server queries the user information of the terminal device, access permission of the third-party server needs to be verified by using the blockchain system. In addition, the storage address of the user information of the terminal device is stored in the blockchain system, which also ensures privacy and immutability of the storage address. This is favorable for protection of the user information.

The actions of the first network element, the third-party server, or the blockchain system in steps S1501 to S1507 may be performed by the processor 601 in the communication device 600 shown in FIG. 6 by invoking the application program code stored in the memory 603. This is not limited in this embodiment.

Optionally, in this embodiment of this application, after obtaining the user information of the terminal device, one third-party server (for example, a third-party server A) may send the user information of the terminal device to another third-party server (for example, a third-party server B), or the third-party server B may actively request the user information of the terminal device from the third-party server A. When the user information of the terminal device obtained by the third-party server B is encrypted user information, and if the third-party server has no information access password or the information access password is invalid, the third-party server B can obtain the information access password from the blockchain system, and further the third-party server B can decrypt the encrypted user information according to the information access password, to obtain the user information of the terminal device. In other words, when one third-party server has stored the user information of the terminal device, but the third-party server has no information access password or the information access password is invalid, the third-party server does not need the original user information of the terminal device, but obtains the information access password from the blockchain system, and further decrypts the encrypted user information according to the information access password, to obtain the user information of the terminal device. When the third-party server (for example, the third-party server B) obtains the information access password from the blockchain system, the blockchain system can record a transaction in which the third-party server obtains the user information of the terminal device, thereby ensuring traceability of access to the user information of the terminal device.

Optionally, in this scenario, when obtaining the information access password from the blockchain system, the third-party server may alternatively obtain the hashed user information of the terminal device from the blockchain system. Further, the third-party server may verify, based on the hashed user information of the terminal device, whether user information of the terminal device obtained from another third-party server is tampered with. For example, after hashing the user information of the terminal device obtained from the other server, the third-party server compares the hashed user information obtained from the other server with the hashed user information of the terminal device obtained from the blockchain system. If the hashed user information obtained from the other server is the same as the hashed user information obtained from the blockchain system, it may prove that the user information is not tampered with. Otherwise, it may be considered that the user information of the terminal device is tampered with. Further, if the user information of the terminal device is not tampered with, the third-party server may decrypt the encrypted user information according to the information access password, to obtain the user information of the terminal device.

It may be understood that, in the foregoing embodiments, the method and/or step implemented by the first network element may be alternatively implemented by a component (for example, a chip or a circuit) that can be used for the first network element, or the method and/or step implemented by the third network element may be alternatively implemented by a component (for example, a chip or a circuit) that can be used for the third network element, or the method and/or step implemented by the third-party server may be alternatively implemented by a component (for example, a chip or a circuit) that can be used for the third-party server.

The solutions provided in the embodiments of this application are mainly described above from the perspective of interaction between network elements. Correspondingly, an embodiment of this application further provides a communication apparatus, and the communication apparatus is configured to implement the foregoing methods. The communication apparatus may be the first network element in the foregoing method embodiments or a chip system that implements functions of the foregoing first network element, or the communication apparatus may be the third network element in the foregoing method embodiments or a chip system that implements functions of the foregoing third network element. It can be understood that, to implement the foregoing functions, the communication apparatus includes a corresponding hardware structure and/or software module for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 16:
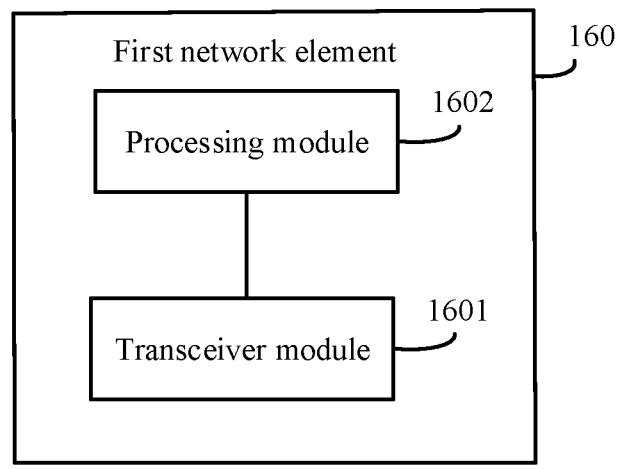
FIG. 16 is a schematic diagram of a structure of a first network element according to an embodiment of this application.

For example, that the communication apparatus is the first network element in the foregoing method embodiment is used as an example. FIG. 16 is a schematic diagram of a structure of a first network element 160. The first network element 160 includes a transceiver module 1601 and a processing module 1602. The transceiver module 1601 may also be referred to as a transceiver unit, and is configured to implement a transceiver function. For example, the transceiver module 1601 may be a transceiver circuit, a transceiver machine, a transceiver, or a communication interface.

The transceiver module 1601 is configured to receive a user data policy from a terminal device. The processing module 1602 is configured to obtain user information of the terminal device according to a user data policy. The processing module 1602 is further configured to send the user information of the terminal device to a second network element according to the user data policy.

Optionally, that the processing module 1602 is configured to obtain user information of the terminal device according to a user data policy includes that the processing module 1602 is configured to, when the user data policy includes a collection policy, obtain the user information of the terminal device according to the collection policy.

Optionally, that the processing module 1602 is configured to send the user information of the terminal device to a second network element according to the user data policy includes that the processing module 1602 is configured to, when the user data policy includes a storage policy, and the storage policy includes an address of the second network element, send the user information of the terminal device to the second network element based on the address of the second network element.

Optionally, the processing module 1602 is further configured to write a first transaction record into a blockchain system, where the first transaction record includes first information, and the first information is used to indicate that the first network element has sent the user information of the terminal device to the second network element.

Optionally, the second network element is a third-party server, and that the transceiver module 1601 is configured to send the user information of the terminal device to a second network element according to the user data policy includes that the transceiver module 1601 is configured to send the user information of the terminal device to the third-party server through a blockchain system according to the user data policy.

Optionally, the second network element is a storage server, and the processing module 1602 is further configured to store the user information of the terminal device in a blockchain system after hashing the user information.

Optionally, the transceiver module 1601 is further configured to receive a first message, where the first message is used to subscribe to the user information of the terminal device from the first network element.

Optionally, the second network element is a third-party server, and the transceiver module 1601 is further configured to receive a second message, where the second message is used to query the user information of the terminal device.

For all related content of the steps in the foregoing method embodiments, reference may be made to function descriptions of a corresponding function module, and details are not described herein again.

In this embodiment, the first network element 160 is presented in a form of functional modules obtained through division in an integrated manner. Herein, the "module" may be a specific ASIC, a circuit, a processor that executes one or more software or firmware programs, a memory, an integrated logic circuit, and/or another component that can provide the foregoing functions. In a simple embodiment, a person skilled in the art may figure out that the first network element 160 may be in a form of the communication device 600 shown in FIG. 6.

For example, the processor 601 in the communication device 600 shown in FIG. 6 may invoke computer-executable instructions stored in the memory 603, to enable the communication device 600 to perform the network slice selection method in the foregoing method embodiments.

Further, functions/implementation processes of the transceiver module 1601 and the processing module 1602 in FIG. 16 may be implemented by the processor 601 in the communication device 600 shown in FIG. 6 by invoking the computer-executable instructions stored in the memory 603. Alternatively, a function/implementation process of the processing module 1602 in FIG. 16 may be implemented by the processor 601 in the communication device 600 shown in FIG. 6 by invoking the computer-executable instructions stored in the memory 603, and a function/implementation process of the transceiver module 1601 in FIG. 16 may be implemented by the communication interface 604 in the communication device 600 shown in FIG. 6.

Because the first network element 160 provided in this embodiment may perform the foregoing data sharing method, for technical effects that can be obtained by the first network element 160, refer to the foregoing method embodiments. Details are not described herein again.

Figure 17:
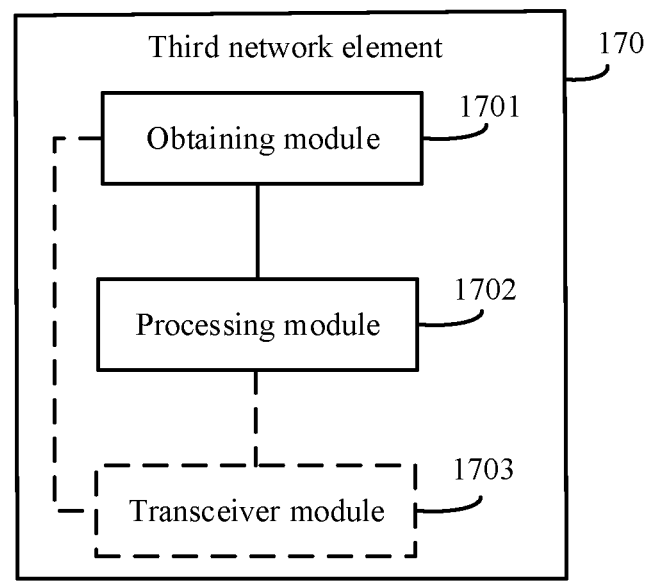
FIG. 17 is a schematic diagram of a structure of a third network element according to an embodiment of this application.

For example, that the communication apparatus is the third network element in the foregoing method embodiments is used as an example. FIG. 17 is a schematic diagram of a structure of a third network element 170. The third network element 170 includes an obtaining module 1701 and a processing module 1702. Optionally, the third network element 170 further includes a transceiver module 1703. The transceiver module 1703 may also be referred to as a transceiver unit, and is configured to implement a transceiver function. For example, the transceiver module 1703 may be a transceiver circuit, a transceiver machine, a transceiver, or a communication interface.

The obtaining module 1701 is configured to obtain a first transaction record, where the first transaction record includes first information, and the first information is used to indicate that a first network element has sent user information of a terminal device to a second network element. The processing module 1702 is configured to publish the first transaction record in a blockchain system.

Optionally, the second network element is a storage server or a third-party server. Correspondingly, the transceiver module 1703 is configured to receive a third message, where the third message is used by the third-party server to subscribe to the user information of the terminal device. The transceiver module 1703 is further configured to send a fourth message, where the fourth message is used to subscribe to the user information of the terminal device from the first network element.

Optionally, the second network element is a storage server. Correspondingly, the transceiver module 1703 is further configured to receive a fifth message, where the fifth message is used by the third-party server to query the user information of the terminal device. The obtaining module 1701 is further configured to obtain a storage address of the user information of the terminal device from the blockchain system. The transceiver module 1703 is further configured to send the storage address of the user information of the terminal device to the third-party server.

Optionally, the second network element is a third-party server. Correspondingly, the transceiver module 1703 is further configured to receive a sixth message, where the sixth message is used by the third-party server to query the user information of the terminal device. The obtaining module 1701 is further configured to obtain the user information of the terminal device from the first network element. The transceiver module 1703 is further configured to send the user information of the terminal device to the third-party server.

Optionally, the third network element is one member node in the blockchain system. The transceiver module 1703 is further configured to receive a user data policy from the terminal device. The processing module is further configured to verify, according to the user data policy, that the third-party server has permission to access the user information of the terminal device.

For all related content of the steps in the foregoing method embodiments, reference may be made to function descriptions of a corresponding function module, and details are not described herein again.

In this embodiment, the third network element 170 is presented with the function modules divided through integration. Herein, the "module" may be a specific ASIC, a circuit, a processor that executes one or more software or firmware programs, a memory, an integrated logic circuit, and/or another component that can provide the foregoing functions. In a simple embodiment, a person skilled in the art may figure out that the third network element 170 may be in a form of the communication device 600 shown in FIG. 6.

For example, the processor 601 in the communication device 600 shown in FIG. 6 may invoke computer-executable instructions stored in the memory 603, to enable the communication device 600 to perform the network slice selection method in the foregoing method embodiments.

Further, functions/implementation processes of the obtaining module 1701, the processing module 1702, and the transceiver module 1703 in FIG. 17 may be implemented by the processor 601 in the communication device 600 shown in FIG. 6 by invoking the computer-executable instructions stored in the memory 603. Alternatively, functions/implementation processes of the obtaining module 1701 and the processing module 1702 in FIG. 17 may be implemented by the processor 601 in the communication device 600 shown in FIG. 6 by invoking the computer-executable instructions stored in the memory 603, and a function/implementation process of the transceiver module 1703 in FIG. 17 may be implemented by using the communication interface 604 in the communication device 600 shown in FIG. 6.

The third network element 170 provided in this embodiment can perform the foregoing data sharing method. Therefore, for technical effects that can be achieved by the third network element, refer to descriptions in the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a system-on-a-chip (SoC) or an ASIC, or may be a separate semiconductor chip. The processor includes a core for executing software instructions to perform operations or processing, and may further include a necessary hardware accelerator, for example, a field-programmable gate array (FPGA), a programmable logic device (PLD), or a logic circuit that implements a dedicated logic operation.

When the foregoing modules or units are implemented by using hardware, the hardware may be any one or any combination of a CPU, a microprocessor, a DSP chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (where for example, the communication apparatus may be a chip or a chip system). The communication apparatus includes a processor, configured to implement the method according to any one of the foregoing method embodiments. In a possible design, the communication apparatus further includes a memory. The memory is configured to store necessary program instructions and data. The processor may invoke program code stored in the memory, to indicate the communication apparatus to perform the method according to any one of the foregoing method embodiments. Certainly, the memory may alternatively not be located in the communication apparatus. When the communication apparatus is the chip system, the communication apparatus may include a chip, or may include the chip and another discrete component. This is not limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions listed in the claims. Some measures are recorded in dependent claims that are different from each other, but this does not mean that these measures cannot be combined to produce a better effect.

Although this application is described with reference to specific features and the embodiments thereof. It is clear that, various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method implemented by a first network element, comprising:
   receiving, from a blockchain account management function network element, a user data policy of a terminal device comprising an access policy corresponding to data description information;
   obtaining, according to the user data policy, user information of the terminal device;
   sending, to a second network element according to the user data policy, the user information; and
   sending, to a blockchain handling function network element, a first transaction record comprising first information for writing into a blockchain system, wherein the first information indicates that the first network element has sent the user information to the second network element.

2. The method of claim 1, wherein the user data policy further comprises a collection policy corresponding to the data description information or a storage policy corresponding to the data description information.

3. The method of claim 2, wherein the user data policy further comprises the collection policy, and wherein the method further comprises further obtaining, according to the collection policy, the user information.

4. The method of claim 2, wherein the user data policy further comprises the storage policy, wherein the storage policy comprises an address of the second network element, and wherein the method further comprises further sending, to the second network element and based on the address, the user information.

5. The method of claim 1, wherein the second network element is a third-party server, and wherein the method further comprises further sending, to the third-party server and through the blockchain system, the user information.

6. The method of claim 1, wherein the second network element is a storage server, and wherein the method further comprises:
   hashing the user information to obtained hashed user information; and
   storing, into the blockchain system, the hashed user information.

7. The method of claim 1, further comprising receiving a first message subscribing to the user information from the first network element.

8. The method of claim 7, wherein the first message comprises address information of the second network element.

9. The method of claim 1, wherein the second network element is a third-party server, and wherein the method further comprises receiving a second message querying the user information.

10. The method of claim 1, wherein the user information comprises:
    when the first network element is a mobility management network element, location information of the terminal device in a first time period, an attachment status of the terminal device, or second information about a first change in an access location of the terminal device; or
    when the first network element is a session management network element, third information about a data network access point accessed by the terminal device, fourth information about a second change in a data access point of the terminal device, or content of a network accessed by the terminal device.

11. A first network element comprising:
    a transceiver configured to receive, from a blockchain account management function network element, a user data policy of a terminal device comprising an access policy corresponding to data description information; and
    one or more processors coupled to the transceiver and configured to:
      obtain, according to the user data policy, user information of the terminal device;
      send, using the transceiver, to a second network element, and according to the user data policy, the user information; and
      send, to a blockchain handling function network element, a first transaction record comprising first information for writing into a blockchain system, wherein the first information indicates that the first network element has sent the user information to the second network element.

12. The first network element of claim 11, wherein the user data policy further comprises a collection policy, and wherein the processor is further configured to further obtain, according to the collection policy, the user information.

13. The first network element of claim 11, wherein the user data policy comprises further a storage policy, wherein the storage policy comprises an address of the second network element, and wherein the processor is further configured to further send, using the transceiver, to the second network element, and based on the address, the user information.

14. The first network element of claim 11, wherein the second network element is a third-party server, and wherein the transceiver is further configured to further send, to the third-party server and through the blockchain system, the user information.

15. The first network element of claim 11, wherein the second network element is a storage server, and wherein the processor is further configured to:
    hash the user information to obtain hashed user information; and
    store, into the blockchain system, the hashed user information.

16. The first network element of claim 11, wherein the transceiver is further configured to receive a first message subscribing to the user information from the first network element.

17. The first network element of claim 11, wherein the second network element is a third-party server, and wherein the transceiver is further configured to receive a second message querying the user information.

18. A computer program product comprising computer-executable instructions that are stored on a non-transitory computer-readable medium and that, when executed by one or more processors, cause a first network element to:
- receive, from a blockchain account management function network element, a user data policy of a terminal device comprising an access policy corresponding to data description information;
- obtain, according to the user data policy, user information of the terminal device;
- send, to a second network element according to the user data policy, the user information; and
- send, to a blockchain handling function network element, a first transaction record comprising first information for writing into a blockchain system, wherein the first information indicates that the first network element has sent the user information to the second network element.

19. The method of claim 1, wherein the first information includes a signature of the first network element.

20. The method of claim 1, wherein the first information includes a time when the user information is sent to the second network element.

* * * * *